US010855409B2

(12) United States Patent
Gholmieh et al.

(10) Patent No.: US 10,855,409 B2
(45) Date of Patent: Dec. 1, 2020

(54) MEDIA ACCESS CONTROL HEADER AND TRANSPORT BLOCK FORMATS

(71) Applicant: QUALCOMM Incorporated, San Diego, CA (US)

(72) Inventors: Aziz Gholmieh, Del Mar, CA (US); Shailesh Maheshwari, San Diego, CA (US); Srinivasan Balasubramanian, San Diego, CA (US); Yue Yang, San Diego, CA (US); Leena Zacharias, San Jose, CA (US); Gang Xiao, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/703,448

(22) Filed: Sep. 13, 2017

(65) Prior Publication Data
US 2018/0102879 A1    Apr. 12, 2018

Related U.S. Application Data

(60) Provisional application No. 62/406,864, filed on Oct. 11, 2016, provisional application No. 62/407,435, (Continued)

(51) Int. Cl.
*H04L 1/18* (2006.01)
*H04L 29/06* (2006.01)
(Continued)

(52) U.S. Cl.
CPC ............ *H04L 1/1867* (2013.01); *H04L 1/004* (2013.01); *H04L 1/1607* (2013.01); *H04L 69/22* (2013.01);
(Continued)

(58) Field of Classification Search
CPC ....... H04L 1/1867; H04L 1/004; H04L 69/22; H04L 1/607; H04W 28/04; H04W 28/06; H04W 28/065; H04W 72/0446
See application file for complete search history.

(56) References Cited

U.S. PATENT DOCUMENTS 6,674,731 B1    1/2004  Bradshaw et al.
8,189,615 B2    5/2012  Malkamaki et al.
(Continued)

FOREIGN PATENT DOCUMENTS

EP      2474181 B1      11/2017
KR   20100082698 A       7/2010

OTHER PUBLICATIONS

International Search Report and Written Opinion—PCT/US2017/067699—ISA/EPO—dated Feb. 23, 2018.
(Continued)

*Primary Examiner* — Ronald B Abelson
(74) *Attorney, Agent, or Firm* — Arent Fox LLP

(57) ABSTRACT

Various aspects described herein relate to encoding or decoding a media access control (MAC) layer transport block having an enhanced MAC header format, a split and partial MAC header, and a MAC transport block design. A method, a computer-readable medium, and an apparatus are provided. The techniques described herein may apply to different communications technologies, including 5th Generation (5G) or New Radio (NR), wireless communications technology.

29 Claims, 14 Drawing Sheets

Related U.S. Application Data filed on Oct. 12, 2016, provisional application No. 62/436,851, filed on Dec. 20, 2016.

(51) Int. Cl.
*H04L 1/00* (2006.01)
*H04L 1/16* (2006.01)
*H04W 28/06* (2009.01)
*H04W 72/04* (2009.01)
*H04W 28/04* (2009.01)
*H04B 7/26* (2006.01)

(52) U.S. Cl.
CPC .......... *H04W 28/04* (2013.01); *H04W 28/06* (2013.01); *H04W 28/065* (2013.01); *H04W 72/0446* (2013.01); *H04B 7/26* (2013.01)

(56) References Cited

U.S. PATENT DOCUMENTS

| | | | |
|---|---|---|---|
| 8,488,551 B2 | 7/2013 | Pelletier et al. | |
| 2006/0105710 A1 | 5/2006 | Imamura et al. | |
| 2008/0186946 A1* | 8/2008 | Marinier | H04J 3/24 |
| 2009/0175259 A1* | 7/2009 | Lucky | H04J 3/24 |
| 2009/0196175 A1 | 8/2009 | Sammour et al. | |
| 2009/0196363 A1 | 8/2009 | Suda et al. | |
| 2010/0061400 A1* | 3/2010 | Hong | H04L 29/02 |
| 2010/0074276 A1 | 3/2010 | Bergstrom et al. | |
| 2010/0208749 A1 | 8/2010 | Chun et al. | |
| 2010/0232356 A1 | 9/2010 | Maheshwari et al. | |
| 2011/0317724 A1* | 12/2011 | Furuta | H04J 3/06 |
| 2012/0057547 A1 | 3/2012 | Loehr et al. | |
| 2012/0218965 A1* | 8/2012 | Chen | H04W 4/00 |
| 2013/0107826 A1 | 5/2013 | Dinan | |
| 2013/0188570 A1 | 7/2013 | Zhao et al. | |
| 2014/0098761 A1 | 4/2014 | Lee et al. | |
| 2014/0198677 A1 | 7/2014 | Xu et al. | |
| 2015/0163695 A1 | 6/2015 | Li et al. | |
| 2015/0257187 A1 | 9/2015 | Kwon et al. | |
| 2015/0339718 A1* | 11/2015 | Walton | G06Q 30/02 |
| 2016/0128093 A1 | 5/2016 | Lee et al. | |
| 2016/0183124 A1 | 6/2016 | Marinier et al. | |
| 2016/0234717 A1 | 8/2016 | Sugaya | |
| 2016/0344782 A1 | 11/2016 | Cheng et al. | |
| 2017/0064649 A1 | 3/2017 | Feuersaenger et al. | |
| 2017/0230149 A1 | 8/2017 | Wang et al. | |
| 2018/0103395 A1 | 4/2018 | Gholmieh et al. | |
| 2018/0176344 A1 | 6/2018 | Yang et al. | |

OTHER PUBLICATIONS

International Search Report and Written Opinion—PCT/US2017/051622—ISA/EPO—dated Nov. 6, 2017.

Ericsson: "Placement of RLC-MAC Headers", Tdoc R2-166824, 3GPP TSG-RAN WG2 #95bis, Kaohsiung, Taiwan, Oct. 10-14, 2016, 7 Pages.

Panasonic: "MAC PDU Structure for NR", 3GPP Draft; R2-167796, 3rd Generation Partnership Project (3GPP), Mobile Competence Centre ; 650, Route Des Lucioles ; F-06921 Sophia-antipolis Cedex ; France vol. RAN WG2, No. Reno, USA; Nov. 14, 2016-Nov. 18, 2016 Nov. 13, 2016, XP051177572, Retrieved from the Internet: URL:http://www.3gpp.org/ftp/Meetings_3GPP_SYNC/RAN2/Docs/ [retrieved on Nov. 13, 2016], 2 pages.

Ericsson: "Report from [95#26] Concatenation (Ericsson)", 3GPP Draft; R2-166904—Report From [95#26] Concatenation (Ericsson), 3RD Generation Partnership Project (3GPP), Mobile Competence Centre; 650, Route Des Lucioles; F-06921 Sophia-Antipolis Cedex; vol. Ran WG2, No. Kaohsiung, Taiwan; Nov. 10, 2016-Nov. 14, 2016, Sep. 30, 2016 (Sep. 30, 2016), XP051161865, 38 Pages, Retrieved from the Internet: URL:http://www.3gpp.org/ftp/tsg_ran/WG2_RL2/TSGR2_95bis/Docs/ [retrieved on Sep. 30, 2016].

* cited by examiner

900 →

| MAC subHDR CE | MAC subHDR SDU1 | MAC subHDR SDU2 | MAC CE | RLC HDR1 | PDCP HDR1 | PDCP SDU1 | RLC HDR2 | PDCP HDR2 | PDCP SDU2 |

| MAC subHDR SDU1 | RLC HDR1 | PDCP HDR1 | PDCP SDU1 | MAC subHDR SDU2 | RLC HDR2 | PDCP HDR2 | PDCP SDU2 |

*FIG. 9B*

1000A: MAC subHDR CE | MAC CE | MAC subHDR SDU1 | RLC HDR1 | PDCP HDR1 | PDCP SDU1 | MAC subHDR SDU2 | RLC HDR2 | PDCP HDR2 | PDCP SDU2

*FIG. 10A*

1000B: MAC subHDR SDU1 | RLC HDR1 | PDCP HDR1 | PDCP SDU1 | MAC subHDR SDU2 | RLC HDR2 | PDCP HDR2 | PDCP SDU2 | MAC subHDR CE | MAC CE

*FIG. 10B*

| MAC subHDR SDU1 | MAC SDU1 | MAC subHDR SDU2 | MAC SDU2 | MAC subHDR SDU3 | MAC SDU3 | MAC subHDR SDU4 | MAC SDU4 | MAC subHDR SDU5 | MAC SDU5 | MAC subHDR CE | MAC CE | MAC Overall HDR |
|---|---|---|---|---|---|---|---|---|---|---|---|---|

MEDIA ACCESS CONTROL HEADER AND TRANSPORT BLOCK FORMATS

CROSS-REFERENCE TO RELATED APPLICATIONS

This application claims the benefit of U.S. Provisional Application Ser. No. 62/407,435, entitled "SPLIT AND PARTIAL MEDIUM ACCESS CONTROL (MAC) HEADERS" filed on Oct. 12, 2016, U.S. Provisional Application Ser. No. 62/406,864, entitled "ENHANCED MAC HEADER FORMAT" filed on Oct. 11, 2016, and U.S. Provisional Application Ser. No. 62/436,851, entitled "MEDIA ACCESS CONTROL TRANSPORT BLOCK DESIGN" filed on Dec. 20, 2016, each of which is expressly incorporated by reference herein in its entirety.

BACKGROUND

Aspects of the present disclosure relate generally to wireless communications, and more particularly, to techniques for generating and/or formatting of a Media Access Control (MAC) layer Packet Data Unit (PDU) for communication in a wireless communications system (e.g., 5G or New Radio (NR)).

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information.

As defined in 3GPP TR 38.913, "Study on Scenarios and Requirements for Next Generation Access Technologies," the target data rate may be up to 20 Gbps for downlink (DL) and/or 10 Gbps for uplink (UL), and the target for user plane latency for some service types (e.g., eMBB) may be 4 ms for UL/DL. With the increased data rates requirements in UL (10 Gbps) and DL (20 Gbps), and the reduced latency requirements of 4 ms or less for both UL and DL, it becomes more important to move most of the processing, e.g., million instructions per second (MIPS) intensive activities, close to hardware (HW) acceleration.

Accordingly, due to the requirements for increased data rates and reduced latency, new approaches may be desirable to improve the system design in order to satisfy consumer demand and improve user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method of wireless communications at a user equipment (UE) is provided. The method may include splitting a media access control (MAC) header into a first portion and a second portion. The method may further include sending, from the UE to a network entity on an uplink communication channel, the first portion of the MAC header at a first time and the second portion of the MAC header at a second time after the first time.

According to another example, a method of wireless communications at a network entity is provided. The method may include receiving, from a UE on an uplink communication channel, at least one of a first portion of a first MAC header at a first time or a second portion of the first MAC header at a second time after the first time. The method may further include transmitting an ACK including at least one of a control portion or a data portion to the UE in response receiving at least one of the first portion of the first MAC header or the second portion of the MAC header. The method may further include determining to transmit one or more MAC control elements on a downlink communication channel to the UE. Additionally, the method may include splitting a second MAC header into a first portion and a second portion. The method further includes sending, from the network to the UE on a downlink communication channel, the first portion of the second MAC header at a first time and the second portion of the second MAC header at a second time after the first time.

According to another example, a method for forming and transmitting transport block is provided. The method may include generating a transport block comprising a plurality of service data units allocated to a plurality of logical channels, the transport block further comprises a media access control overall header, the media access control overall header indicating a logical channel of the plurality of logical channels for each of the plurality of service data units. The method may further include transmitting the transport block to a device.

According to another example, a method for forming and transmitting a transport block is provided. The method may include generating a transport block comprising a plurality of service data units and a corresponding plurality of media access control sub-headers, each media access control sub-header is adjacent to a corresponding service data unit in the transport block, and wherein the transport block further comprises a MAC control element having a separate corresponding media access control sub-header, the MAC control element and corresponding media access control sub-header located at an end of the transport block. The method may further include transmitting the transport block to a device.

According to a further example, a method related to enhancements in a MAC header used in a wireless communications system is provided. The method includes identifying, by a processor, pending information received on one or more logical channels at a MAC layer, the pending information includes data information and/or control information to be included in a MAC transport block. The method also includes determining, by the processor, a size requirement corresponding to an amount of space that will be taken up by the pending information and corresponding MAC subheader information in the transport block. Further, the method includes determining, by the processor, a remaining space available in the transport block. When the remaining space in the transport block is greater than the size requirement, the method includes initiating encoding of the pending information into the transport block. Also, when the remaining space in the transport block is less than or equal to the size requirement, the method includes determining a MAC header size based at least in part on a size of stored subheader information corresponding to prior information already encoded into the MAC transport block, initiating encoding of at least the stored subheader information and a MAC header size indication representing the MAC header size into the MAC transport block such that the stored subheader information and the MAC header size indication are encoded subsequent to, and positioned within the MAC transport block subsequent to, at least the prior information; and initiating transmission of the MAC transport block.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein.

In another aspect, an apparatus for wireless communication is provided that includes means for performing the operations of methods described herein.

In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIGS. 9A and 9B are block diagrams of example transport blocks according to one or more of the presently described aspects.

FIGS. 10A and 10B are block diagrams of example transport blocks according to one or more of the presently described aspects.

FIG. 11 is a block diagram of an example transport block according to one or more of the presently described aspects.

DETAILED DESCRIPTION

Figure 1:
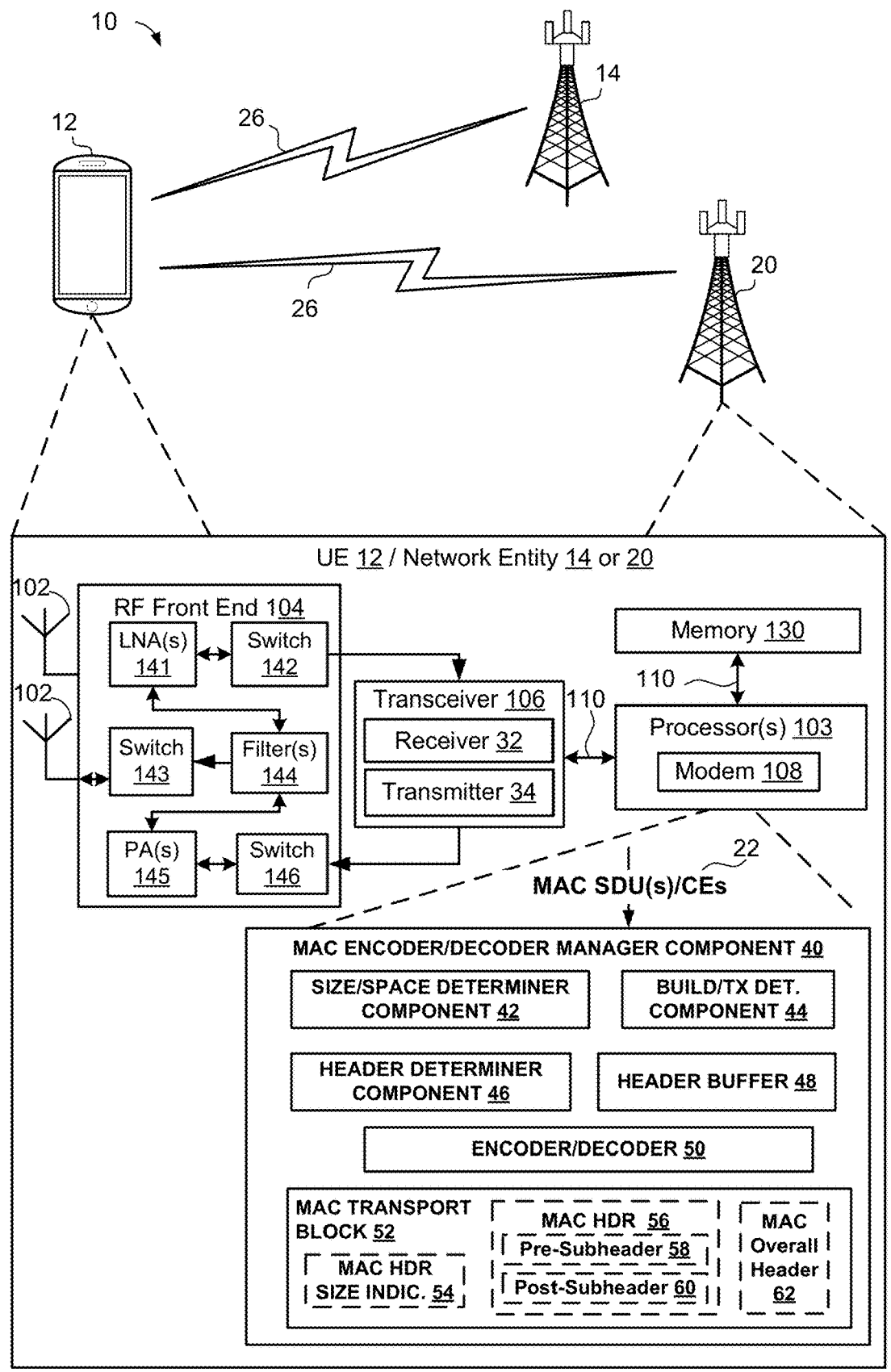
FIG. 1 is a block diagram illustrating an example communications network including at least one network entity in communication with a user equipment (UE) configured to encode or decode a media access control (MAC) layer packet data unit (PDU), also referred to as a MAC transport block (TB), having an enhanced MAC header format according to one or more of the presently described aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Also, the term "component" as used herein may be one of the parts that make up a system, may be hardware, firmware, and/or software, and may be divided into other components.

This disclosure includes various aspects for encoding and/or decoding a MAC transport block (TB) having an enhanced MAC header format, such as in a wireless communications system (e.g., 5G or NR). The MAC TB may also be referred to as a MAC packet data unit (PDU). In particular, in the encoding aspect, the present disclosure includes an apparatus and method that operates at the MAC layer to start writing or providing the MAC service data unit (SDU) and/or control elements (CEs) into the encoder as the MAC layer parses them, and to separately compute and store the associated MAC subheader information. The associated MAC subheader information can subsequently be encoded into the MAC transport block as the MAC header, e.g., when the MAC transport block would be substantially filled when taking into account a size of the stored associated MAC subheader information and a size of the corresponding MAC SDUs/CEs already encoded into the MAC transport block. Additionally, the present apparatus and methods include encoding a MAC header size indicator at the end of the MAC transport block. The MAC header size indicator provides a receiving device with an indication of a size of the MAC header, thereby allowing the receiving device to identify where the MAC header can be found within the MAC transport block.

For instance, in the encoding aspect, the present apparatus and methods enable the MAC layer to continue encoding the MAC SDU/CEs into the MAC transport block while computing the associated MAC subheaders. For example, each respective MAC SDU/CE can be encoded into the MAC transport block as long as the respective MAC SDU/CE, in addition to the corresponding computed MAC subheader information, fits into a remaining space in the MAC transport block. At a point when no more MAC SDUs/CEs (and their associated MAC subheader information) can fit into the remaining space, the disclosed apparatus and methods can then subsequently encode the associated MAC subheader information, for all the MAC SDUs/CEs already written, at the end of the MAC transport block. Additionally, the disclosed apparatus and methods can determine and encode a MAC header size indicator at the end. Accordingly, for example, the present apparatus and methods may result in improved (e.g., reduced) encoding time and processing requirements, e.g., by initiating the encoding of the MAC SDUs/CEs into the MAC transport block as soon as they are received and read.

The disclosed apparatus and methods may address one or more problems in prior techniques with respect to meeting the demands of higher data throughput and lower latency expected for 5G or NR communications. For instance, the present disclosure may improve (e.g., reduce) the amount of processing, e.g., measured in million instructions per second (MIPS), of the processor, as well as moving the encoder logic closer to the hardware accelerator (e.g., the specialized encoder/decoder). For instance, prior techniques compute all the MAC subheaders ahead of time and write the MAC header (including all of the respective MAC subheaders) in the beginning of the MAC transport block, which is not optimal from an encoding perspective as all the MAC subheaders can only be known after parsing all the MAC SDUs/CEs based on the MAC transport block size. Also, even though such prior techniques parse all the MAC SDUs/CEs to compute the MAC subheaders, they are not written into the MAC transport block as the MAC header size is not known upfront and the MAC SDU starting point is not known while parsing the MAC SDUs. Thus, as compared to prior techniques, the disclosed apparatus and methods may increase the efficiency of encoding of a MAC transport block.

This disclosure further includes various aspects for split and partial MAC headers. Specifically, to provide transmitter and receiver hardware acceleration at the UE, MAC headers may be split or divided into at least two portions for placement at a beginning and at an end of the MAC PDU. The forgoing may be adaptive so as to support a wide variety of devices and applications. Further, a split MAC header may also provide multi-connectivity and interworking for wireless wide area network (WWAN) (e.g., LTE) and wide local area network (WLAN). The split MAC header may apply to all protocols between the Internet protocol (IP) and physical layers including the packet data convergence protocol (PDCP) layer, radio link control (RLC) layer, and/or the MAC layer. As such, the present aspects may split the MAC header into at least a first portion and a second portion, and sending, from the transmitter to a receiver, the first portion at a first time and the second portion at a second time, the second time is after the first time.

This disclosure additionally includes various aspects for a MAC transport block design. For example, a UE may transmit data on an uplink as a TB. In certain aspects, the TB may be formed, for example, by a MAC layer of the UE and be referred to as a MAC TB. For example, the UE may receive an uplink grant from a BS indicating a number of TBs the UE can transmit to the base station or network entity and the size of each TB. The UE, accordingly, may generate TBs and transmits them to the BS on the resources (e.g., layers, such as frequency carriers and/or spatial layers, and symbols) allocated, defined, scheduled, or etc., in the uplink grant. In some aspects, the UE transmits multiple TBs to the BS at a time. In particular, each TB may be sent on a different layer from the UE to the BS at the same time (e.g., on the same symbols) of the uplink.

Further, in some aspects, the UE may have data (e.g., corresponding to one or more PDCP service data units (SDUs), etc.) corresponding to one or more logical channels (e.g., control channels, traffic channels, PUCCH, PUSCH, etc.) to transmit to the BS. The UE may use the PDCP SDUs to build the TBs.

In some aspects, the UE builds a TB including PDCP SDUs. For example, in some aspects, the UE (e.g., PDCP layer of the UE) may generate a PDCP protocol data unit (PDU) for each PDCP SDU. Each PDCP PDU may include the PDCP SDU and a corresponding PDCP header. Further, in some aspects, the UE (e.g., RLC layer of the UE) may generate a RLC PDU for each PDCP PDU. Each RLC PDU may include the PDCP PDU (also referred to as a RLC SDU) and a corresponding RLC header. In some aspects, the UE (e.g., MAC layer of the UE) may generate a TB (also referred to as a MAC PDU) that includes multiple RLC PDUs (also referred to as MAC SDUs). Each TB, as discussed herein, may include one or more RLC PDUs and one or more corresponding MAC sub-headers. In some aspects, the TB may further include one or more MAC CEs and a corresponding MAC sub-header for each of the one or more MAC control elements. Accordingly, in certain aspects, the UE may generate three headers, a PDCP header, a RLC header, and a MAC sub-header for each PDCP SDU.

In some aspects, the PDCP header may include one or more of a sequence number (SN) for the PDCP SDU, whether the PDCP SDU is data or control information (e.g., a D/C bit), SN length information, a PDCP PDU type, etc. In some aspects, the RLC header may include one or more of a SN for the RLC SDU, an extension bit, a length indicator field, a D/C bit, etc. In some aspects, the MAC sub-header for MAC SDUs may include one or more of a logical channel identifier (LCID) indicating the logical channel for the corresponding MAC SDU and a length of the MAC SDU. In some aspects, the MAC sub-header for MAC CEs may include a LCID that indicates the type of MAC CE and a length of the MAC CEs. Each MAC CE may carry control information for signaling between the UE and BS, such as a power headroom report, UE contention resolution identity, timing advance command, buffer status report, discontinuous reception (DRX) command, etc.

In some aspects described herein, RLC concatenation (e.g., concatenation of RLC SDUs in a single RLC PDU) is not used, and therefore the length indicator field in the RLC header may not be included. Below are discussed different designs for TB in accordance with different aspects of the present disclosure.

Each of the aspects described herein with respect to the disclosed MAC transport block may be applied to and/or performed for either or both of downlink and uplink transmissions.

Also, each of the aspects described above may be performed or implemented in connection with the subject matter included in FIGS. 1-16, which are described in more detail below.

Referring to FIG. 1, in an aspect, a wireless communication system 10 includes at least one UE 12 in communication coverage of at least one network entity 14 or network entity 20 (e.g., base station or eNB, or a cell thereof, in a 5G NR network). The UE 12 may communicate with a network via the network entity 14 or network entity 20. In some aspects, multiple UEs including UE 12 may be in communication coverage with one or more network entities, including network entity 14 and network entity 20. In an aspect, the network entity 14 or network entity 20 may be a base station such an eNodeB/eNB in a long term evolution (LTE) network including an evolved packet core (EPC) (not shown). Although various aspects are described in relation to a UMTS, LTE, or 5G NR networks, similar principles may be applied in other wireless wide area networks (WWAN). The wireless network may employ a scheme where multiple base stations may transmit on a channel. In an example, the UE 12 may transmit and/or receive wireless communications to and/or from network entity 14 and/or network entity 20. For example, the UE 12 may be actively communicating with the network entity 14 and/or network entity 20.

In some aspects, the UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. Additionally, the network entity 14 or network entity 20 may be a macrocell, picocell, femtocell, relay, Node B, mobile Node B, small cell box, UE (e.g., communicating in peer-to-peer or ad-hoc mode with UE 12), or substantially any type of component that can communicate with the UE 12 to provide wireless network access at the UE 12.

According to the present aspects, the UE 12 and/or network entity 14/20 may include one or more processors 103 and a memory 130 that may operate in combination with a MAC encoder/decoder manager component 40 at a MAC protocol layer to control an encoder/decoder 50 for encoding or decoding a MAC transport block 52 having an enhanced MAC header format as described herein. For instance, the enhanced MAC header format may include a MAC header (HDR) size indicator 54 positioned at an end of the MAC transport block 52 to indicate a size of all or a portion of a MAC header 56, which in some aspects may be positioned subsequent to MAC SDUs and/or MAC CEs (MAC SDUs/CEs 22) that are encoded into the MAC transport block 52.

MAC encoder/decoder manager component 40 may operate to encode MAC SDUs/CEs 22 into the MAC transport block 52 in response to or as soon as they are parsed, e.g., from a queue of a logical channel, while storing the corresponding MAC subheader information in a header buffer 48 for subsequent encoding into the MAC transport block 52. For example, upon identifying one or more MAC SDUs/CEs 22 for transmission, the MAC encoder/decoder manager component 40 may operate a size/space determiner component 42 to determine a size requirement corresponding to an amount of space needed to include the respective MAC SDU/CE 22, and the corresponding MAC subheader information, in the MAC transport block 52. Additionally, the size/space determiner component 42 may be configured to determine a MAC transport block remaining space corresponding to an amount of space available within the MAC transport block 52 for including the respective MAC SDU/CE 22 the corresponding MAC subheader information. In determining the MAC transport block remaining space, the size/space determiner component 42 may be configured to take into account an amount of space needed to include the stored MAC subheader information for the prior MAC SDUs/CEs 22 that have already been encoded into the MAC transport block 52. In an aspect, the size/space determiner component 42 may be configured to communicate with a header determiner component 46 that is configured to determine a size requirement of the respective MAC SDU/CE 22 and corresponding MAC subheader information, as well as the amount of space needed for the stored MAC subheader information for the prior MAC SDUs/CEs 22 that have already been encoded into the MAC transport block 52. Further, in an aspect, the size/space determiner component 42 and/or header determiner component 46 may be configured to communicate with the header buffer 48, if necessary, to obtain information about the stored MAC subheader information for the prior MAC SDUs/CEs 22 that have already been encoded. Additionally, the MAC encoder/decoder manager component 40 may include a build/transmit (TX) determiner (DET) component 44 that makes a decision to keep building the MAC transport block 52, e.g., by encoding the respective MAC SDU/CE 22, or to halt adding the new MAC SDUs/CEs 22, encode MAC header 56 and MAC header size indicator 54, and initiate transmission of the MAC transport block 52. For instance, the build/transmit (TX) determiner (DET) component 44 is configured to communicate with size/space determiner component 42, obtain and compare the size requirement versus the remaining space, and thereby make the build or initialize transmission decision based on whether or not the respective MAC SDU/CE 22 and the corresponding MAC subheader information can fit within the remaining space in the MAC transport block 52.

The MAC encoder/decoder manager component 40 may, via the header determiner component 46, further be configured to split the MAC header 56 into a first portion corresponding to a pre-subheader 58 and a second portion corresponding to a post-subheader 60. For example, MAC information may have conflicting or varying requirements on when the information may be generated, and how early the information is needed or requested at a receiver. In particular, placement of information may be preferred at a beginning of a PDU (e.g., MAC transport block 54) if the information is needed or requested for early processing at the receiver. On the other hand, information that needs time to be generated at the render may be placed or provided at the end of the PDU (e.g., MAC transport block 54). In some aspects, MAC information may not generally fall under both of the forgoing categories (e.g., information for early processing or information that may need time for generating). The split MAC header may allow for the preferred of both of the options or categories so as to improve the distribution of delays between the UE 12 and the network entity 14 or 20.

For example, the MAC encoder/decoder manager component 40 may, via the header determiner component 46, be configured to split or divide the MAC header 56 into at least two parts that can be processed independently. A first portion may correspond to a pre-subheader 58, and may be placed at a beginning of the MAC PDU (e.g., MAC transport block 52). The pre-subheader 58 may include data that may be critical to be used immediately at the receiver. In some aspects, the UE 12 may generate such data earlier. For instance, MAC control elements may be one type of data that may be generated early. A second portion may correspond to a post-subheader 60, and may be placed at the end of the MAC PDU (e.g., MAC transport block 52). The post-subheader 60 may include data that may take time to be generated at the sender. Further, in some aspects, such data may not be used at the receiver until a whole packet is received. In an example, the post-subheader 60 may include a header structure. The division or split may be performed per MAC subheader. Also, rather than adding an LCID/length combination per MAC SDU, an indication of a length may be included in one of the headers in a MAC SDU so that the MAC SDUs can be independently decoded.

As shown in Table 1 below, a preferred placement of example MAC control elements is provided in both the uplink and downlink directions. The "-" in the best placement column may indicate that a control elements could be placed in the pre-subheader 58 or the post-subheader 60. For example, a structure of the MAC PDU (e.g., MAC transport block 52) may be sent later in the PDU, as the processing may begin only when a last symbol is received (e.g., due to the coding structure with serial to parallel mapping).

TABLE 1

| MAC Control Elements | Direction | Best placement |
|---|---|---|
| Buffer Status Report MAC Control Elements | UL | Pre-header |
| Sidelink BSR MAC Control Elements | UL | Pre-header |
| C-RNTI MAC Control Element | UL | — |
| Power Headroom Report MAC Control Element | UL | Pre-header |
| Extended Power Headroom Report MAC Control Elements | UL | Pre-header |
| Dual Connectivity Power Headroom Report MAC Control Element | UL | Pre-header |
| Activation/Deactivation MAC Control Elements | DL | Pre-header |
| Long DRX Command MAC Control Element | DL | — |
| DRX Command MAC Control Element | DL | — |
| UE Contention Resolution Identity MAC Control Element | DL | — |
| Timing Advance Command MAC Control Element | DL | Pre-header |

MAC encoder/decoder manager component 40, and the corresponding one or more subcomponents, may include hardware, firmware, and/or software code executable by the processor 103, and/or memory 130, for performing the operations described herein. For example, in an aspect, the hardware may include a hardware accelerator or specialized processor. The memory 130 may include information, such as one or more queues of MAC SDUs/CEs 22 from one or more logical channels, and/or header buffer 48 including the stored MAC subheader information of already-encoded ones of the MAC SDUs/CEs 22.

The processor 103, memory 130, and/or MAC encoder/decoder manager component 40 may be communicatively coupled with a transceiver 106, which may include a receiver 32 for receiving and processing RF signals and a transmitter 34 for processing and transmitting RF signals. For example, the processor 103 may be coupled to the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by UE 12 or network entity 14/20. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 can include a modem 108 that uses one or more modem processors. The various functions related to MAC encoder/decoder manager component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with the transceiver 106.

Moreover, in an aspect, UE 12 and/or network entity 14/20 may include RF front end 104 and transceiver 106 for receiving and transmitting radio transmissions, for example, wireless communications 26. For example, transceiver 106 may transmit or receive MAC transport block 52.

The RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. The transceiver 106 may connect to one or more modems 108 and processor 103.

In an aspect, the LNA 141 can amplify a received signal at a desired output level. In an aspect, each LNA 141 may have a specified minimum and maximum gain values. In an aspect, the RF front end 104 may use one or more switches 142, 143 to select a particular LNA 141 and its specified gain value based on a desired gain value for a particular application.

Further, for example, one or more PA(s) 145 may be used by the RF front end 104 to amplify a signal for an RF output at a desired output power level. In an aspect, each PA 145 may have a specified minimum and maximum gain values. In an aspect, the RF front end 104 may use one or more switches 143, 146 to select a particular PA 145 and its specified gain value based on a desired gain value for a particular application.

Also, for example, one or more filters 144 can be used by the RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, the RF front end 104 can use one or more switches 142, 143, 146 to select a transmit or receive path using a specified filter 144, LNA, 141, and/or PA 145, based on a configuration as specified by transceiver 106 and/or processor 103.

The transceiver 106 may be configured to transmit and receive wireless signals through antenna 102 via the RF front end 104. In an aspect, transceiver may be tuned to operate at specified frequencies such that the UE 12 can communicate with, for example, the network entity 14 or network entity 20. In an aspect, for example, modem 108 can configure the transceiver 106 to operate at a specified frequency and power level based on the UE configuration of the UE 12 and communication protocol used by the modem 108.

In an aspect, the modem 108 can be a multiband-multimode modem, which can process digital data and communicate with the transceiver 106 such that the digital data is sent and received using the transceiver 106. In an aspect, the modem 108 can be multiband and be configured to support multiple frequency bands for a specific communications protocol. In an aspect, the modem 108 can be multimode and be configured to support multiple operating networks and communications protocols. In an aspect, the modem 108 can control one or more components of the UE 12 or network entity 14/20 (e.g., RF front end 104, transceiver 106) to enable transmission and/or reception of signals based on a specified modem configuration. In an aspect, the modem configuration can be based on the mode of the modem and the frequency band in use. In another aspect, the modem configuration can be based on UE configuration information associated with the UE 12 as provided by the network during cell selection and/or cell reselection. The UE 12, network entity 14, or network entity 20 may further include the memory 130, such as for storing data used herein and/or local versions of applications or MAC encoder/decoder manager component 40 and/or one or more of its subcomponents being executed by processor 103. The memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining MAC encoder/decoder manager component 40 and/or one or more of its subcomponents, and/or data associated therewith, when the UE 12 and/or network entity 14/20 is operating processor 103 to execute the MAC encoder/decoder manager component 40 and/or one or more of its subcomponents. In another aspect, for example, the memory 130 may be a non-transitory computer-readable storage medium.

Referring to FIGS. 2-6, example MAC transport block structures 200, 400, 500 and 600 (FIGS. 2 and 4-6) according to the described aspects includes MAC HDR The size indicator 54 and flexibility in the positioning of the MAC header 56 (including MAC sub-headers), MAC control elements, and MAC service data units (SDUs), as compared to an existing MAC transport block structure 300 (FIG. 3) that defines a fixed format that may be inefficient for encoding at a MAC layer as compared to the enhanced format of the MAC transport block structures 200, 400, 500 and 600.

Figure 2:
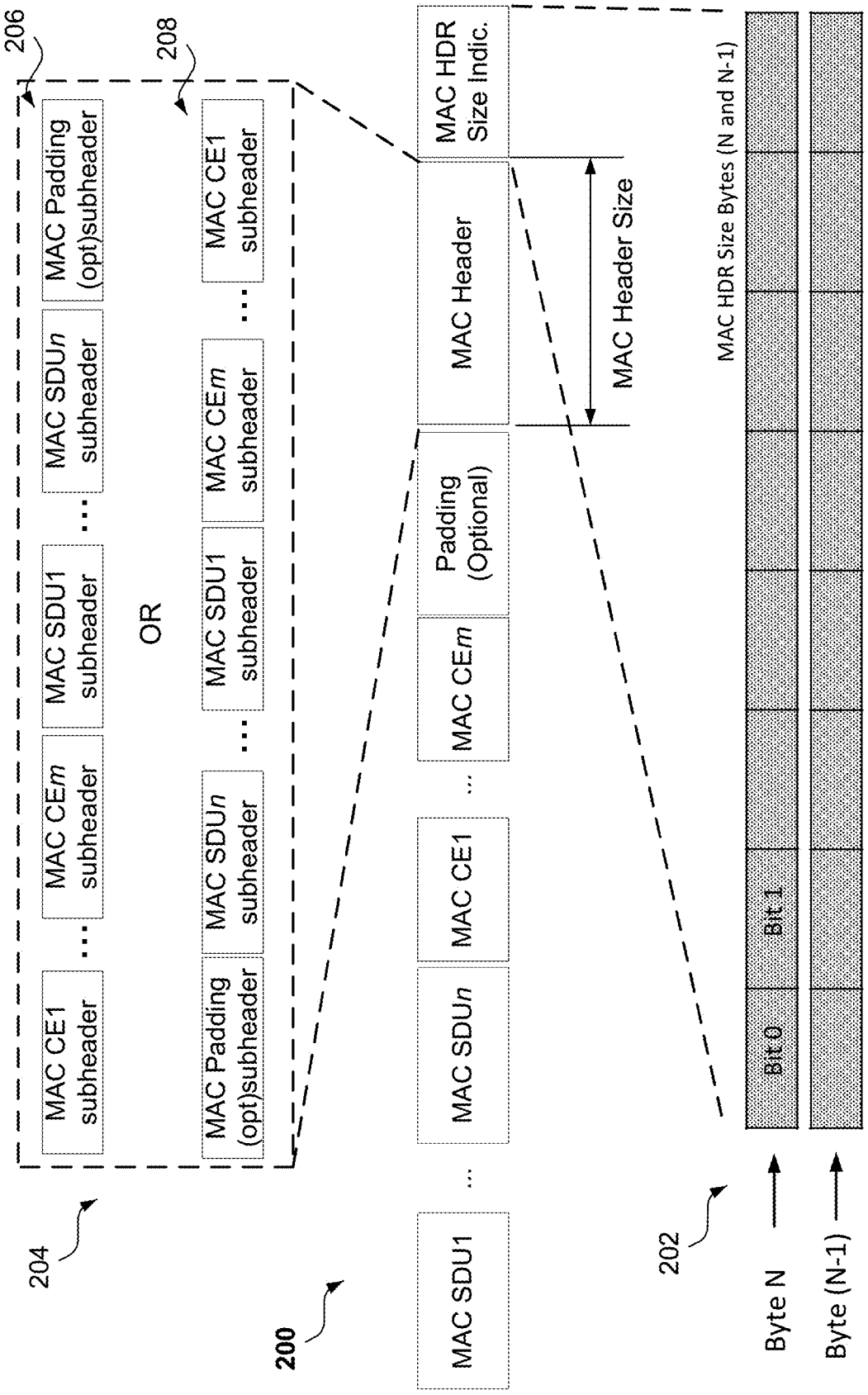
FIG. 2 is a block diagram of an example MAC transport block having an example of an enhanced header format according to one or more of the presently described aspects.
Figure 3:
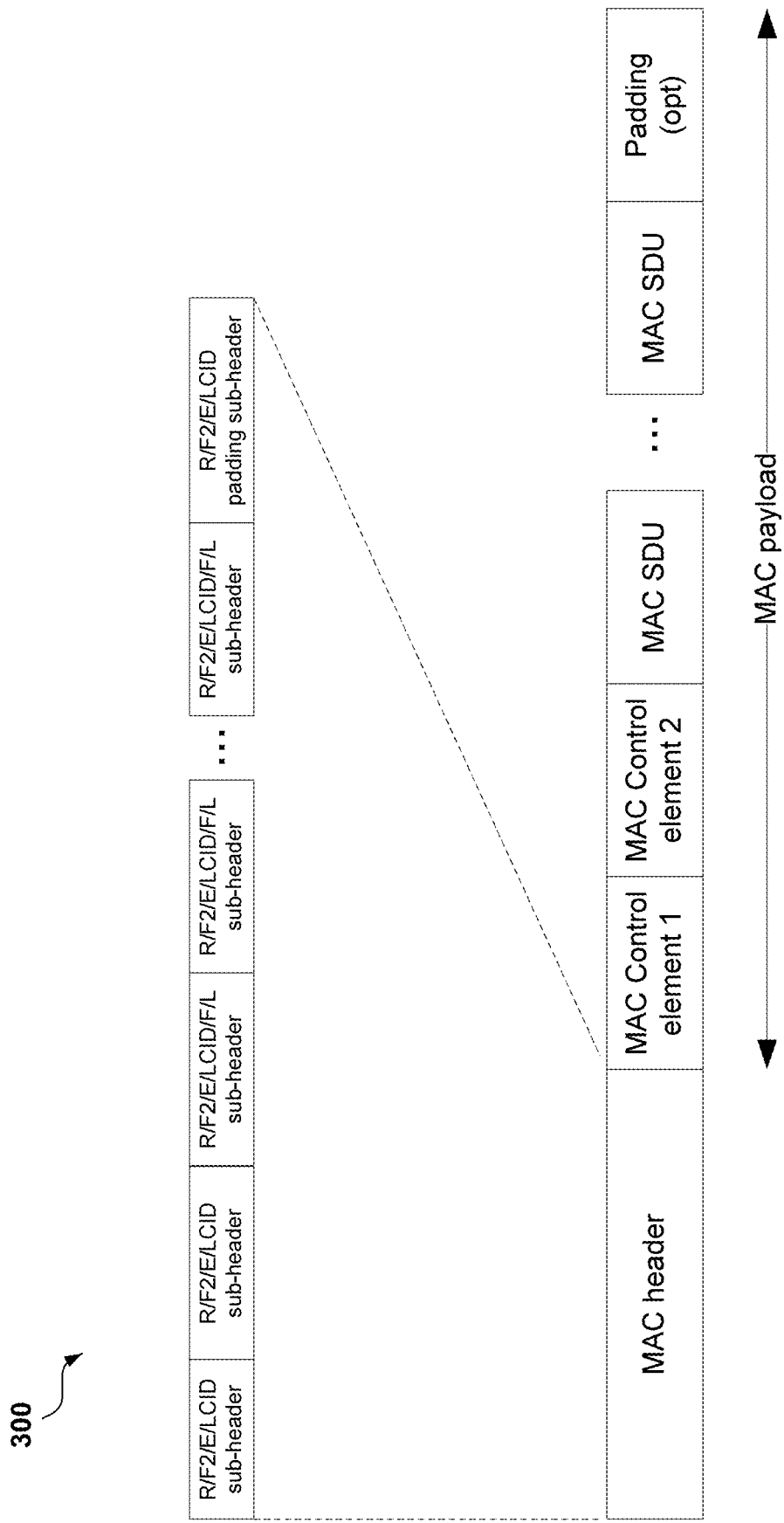
FIG. 3 is a block diagram of an example MAC transport block.

Referring specifically to FIG. 2, example MAC transport block structure 200 defines a MAC Transport Block=n*RLC PDUs+m*MAC CE+(n+m)*MAC HDRs+MAC HDR Size, where n and m respectively may be any number. MAC HDR Size indicates total number of bytes corresponds to all MAC HDRs from the end, excluding MAC HDR Size.

At 202, MAC HDR Size can be a fixed size (e.g., 1 or 2 Bytes indicating the total number of MAC HDR bytes).

Alternatively, MAC HDR Size can be a variable size. For instance, when MAC HDR Size is indicated in Byte N (where N is the last Byte of the MAC TB), then the first 2 bits (Bit 0, Bit 1) of Byte N can represent a length indicator (LI) Size. For example, the first two bits may have one of the following formats:

1. (Bit 0, Bit 1) (0, 0)—1 Byte—6 bits to represent MAC HDR Size,
2. (Bit 0, Bit 1) (0, 1)—2 Byte—14 bits to represent MAC HDR Size,
3. (Bit 0, Bit 1) (1, x)—Reserved Thus, the present aspects can configured MAC Header Size at the end of the MAC transport block to indicate the amount of MAC HDR in this MAC Transport block. In an aspect, MAC HDR includes combined information about each MAC SDU, MAC CE, and, optionally, Padding. In some implementations, such as in the example of FIG. 2, MAC HDR is only at the end of the MAC transport block while the complete RLC PDUs are arranged from the beginning of the MAC transport block .

Additionally, at 204, MAC HDRs can be written in one or more different formats. For example, but not limited hereto:

First Format 206=
MAC CE 1, MAC CE 2, . . . MAC CE n, MAC Sub-HDR 1, MAC Sub-HDR 2, MAC Sub-HDR 3, MAC Sub-HDR 4, MAC Sub-HDR 5, MAC Sub-HDR 6, PAD; and Second Format 208=
PAD, MAC Sub-HDR 5, MAC Sub-HDR 4, MAC Sub-HDR 3, MAC Sub-HDR 2, MAC Sub-HDR 1, MAC CE n . . . MAC CE 2, MAC CE 1

Figure 4:
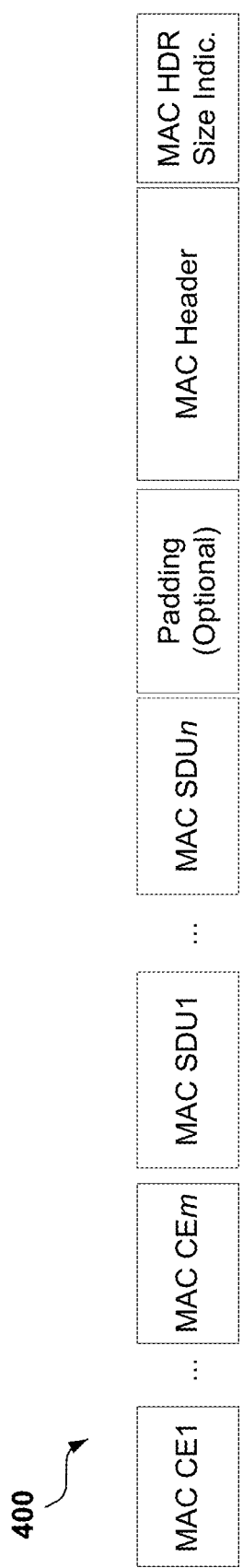
FIG. 4 is a block diagram of an additional example of MAC transport blocks each having a different example of an enhanced header format according to one or more of the presently described aspects.
Figure 5:
FIG. 5 is a block diagram of a further example of MAC transport blocks each having a different example of an enhanced header format according to one or more of the presently described aspects.
Figure 6:
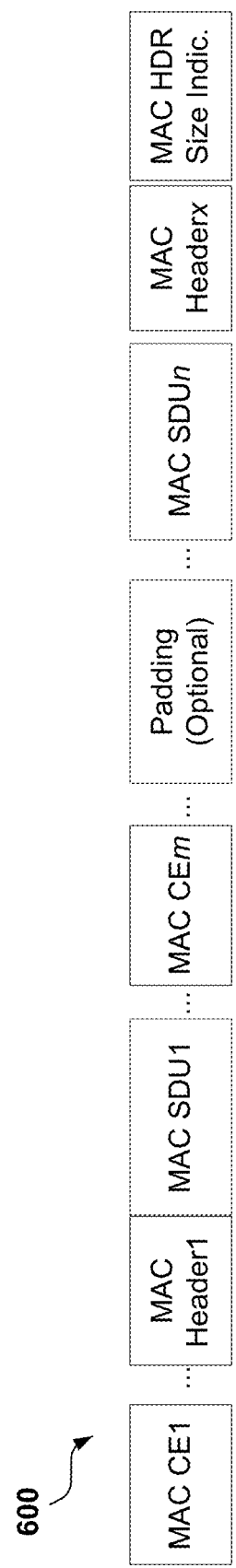
FIG. 6 is a block diagram of a further example of MAC transport blocks each having a different example of an enhanced header format according to one or more of the presently described aspects.

Referring to FIGS. 4-6, additional example MAC transport block structures 400, 500 and 600 provide additional alternatives for flexible arrangement of the various components of the MAC transport block 52 according to one or more implementations of the present disclosure.

For instance, the MAC transport block structure 400 includes MAC CEs positioned before MAC SDUs at the beginning (or leading end) of the MAC transport block, which may occur when prioritizing one or more types of CEs over SDUs when multiplexing logical channel information.

Also, for instance, the MAC transport block structure 500 includes MAC CEs mixed with MAC SDUs and Padding at the beginning of the MAC transport block, which may occur when CEs and SDUs and padding have differing priorities and/or when they are parsed as they occur within the logical channel queues when multiplexing logical channel information.

Additionally, for instance, the MAC transport block structure 600 includes the MAC header divided into two or more, e.g., up to x where x is any number, of portions. In this case, the MAC Header portions may be mixed with MAC CEs, MAC SDUs, and Padding at the beginning of the MAC transport block, which may occur when CEs and SDUs and padding have differing priorities and/or when they are parsed as they occur within the logical channel queues when multiplexing logical channel information. In some cases, for example, at least a last portion (e.g., MAC Headerx) of the two or more portions of the MAC Header maybe positioned at the end (e.g., the trailing end) of the MAC transport block, and the corresponding MAC HDR Size indicator may be configured to provide a size of the adjacent MAC Headerx.

Figure 7:
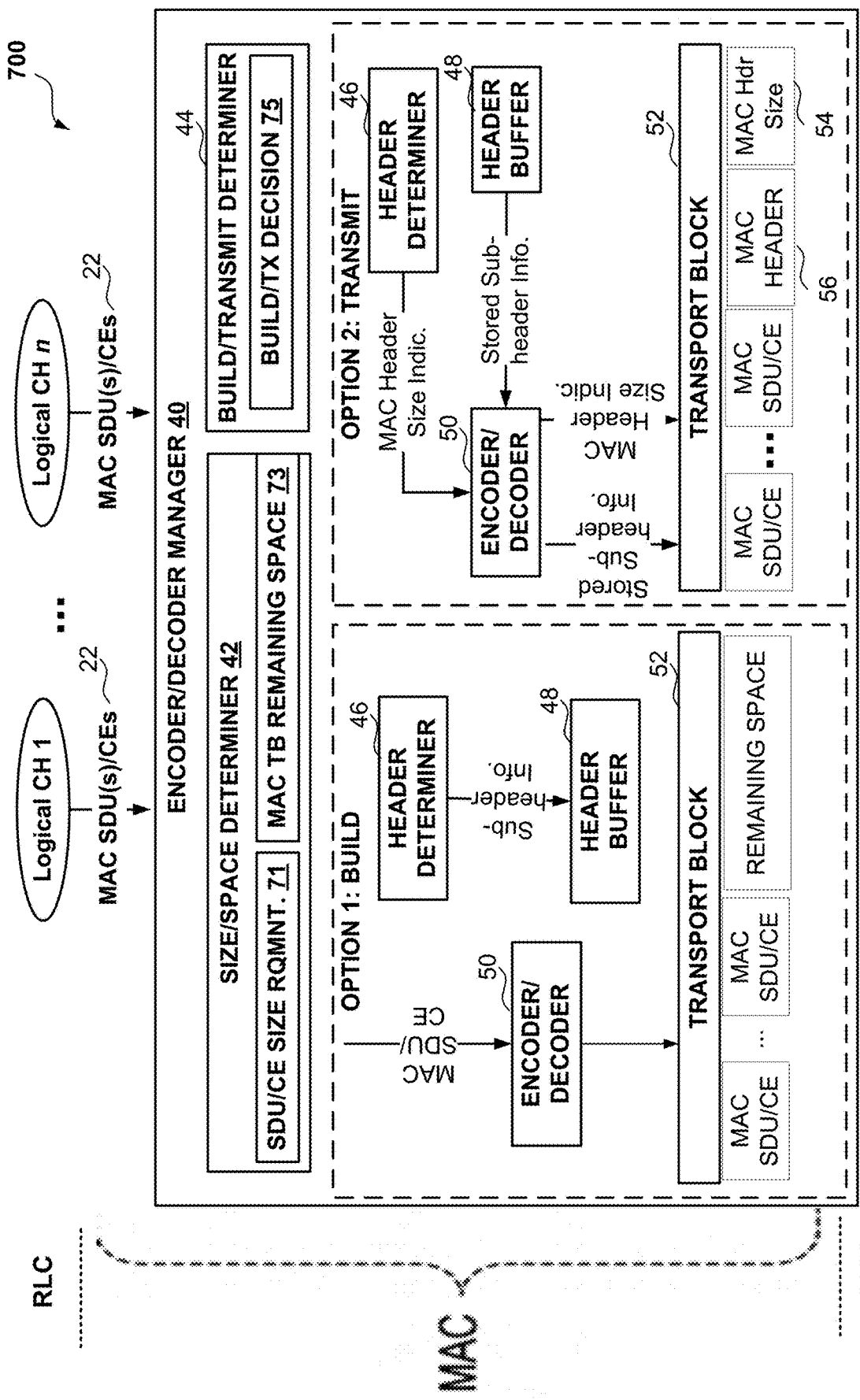
FIG. 7 is a schematic diagram of an example architecture and data flow associated with operation of the encoder/decoder manager in an example of building a MAC transport block (TB) having an enhanced MAC header format according to one or more of the presently described aspects.

Referring to FIG. 7, an example architecture and data flow 700, which should not be construed as limiting, includes a MAC encoder/decoder manager 40 performing the operations described herein for building a MAC transport block 52 having an enhanced MAC header 56, e.g., including MAC HDR Size indicator 54 positioned at an end of the MAC transport block 52. In particular, the MAC encoder/decoder manager 40 operates according to a first option to build the MAC transport block 52 and a second option to initiate transmission of a substantially filled the MAC transport block 52 in response to a build/transmit decision 73 of build/transmit determiner component 44. The build/transmit decision 73 is based on whether the MAC transport block remaining space 73 is less than a size requirement 71 identifying an amount of space needed for the respective MAC SDU/CE 22 and corresponding MAC subheader information. In the first option, the MAC encoder/decoder manager 40 operates to encode a respective MAC SDU/CE 22 while storing corresponding MAC subheader information in header buffer 48. In the second option, the MAC encoder/decoder manager 40 operates to encode the stored subheader information as the MAC header 56, encode the MAC header size indicator 54 at the end, and initiate transmission of MAC transport block 52. Optionally, although not illustrated, in order to fill up the MAC transport block 52, the second option may additionally include encoding padding, and adding MAC subheader information for the padding to the stored MAC subheader information and encoding the result.

Figure 8:
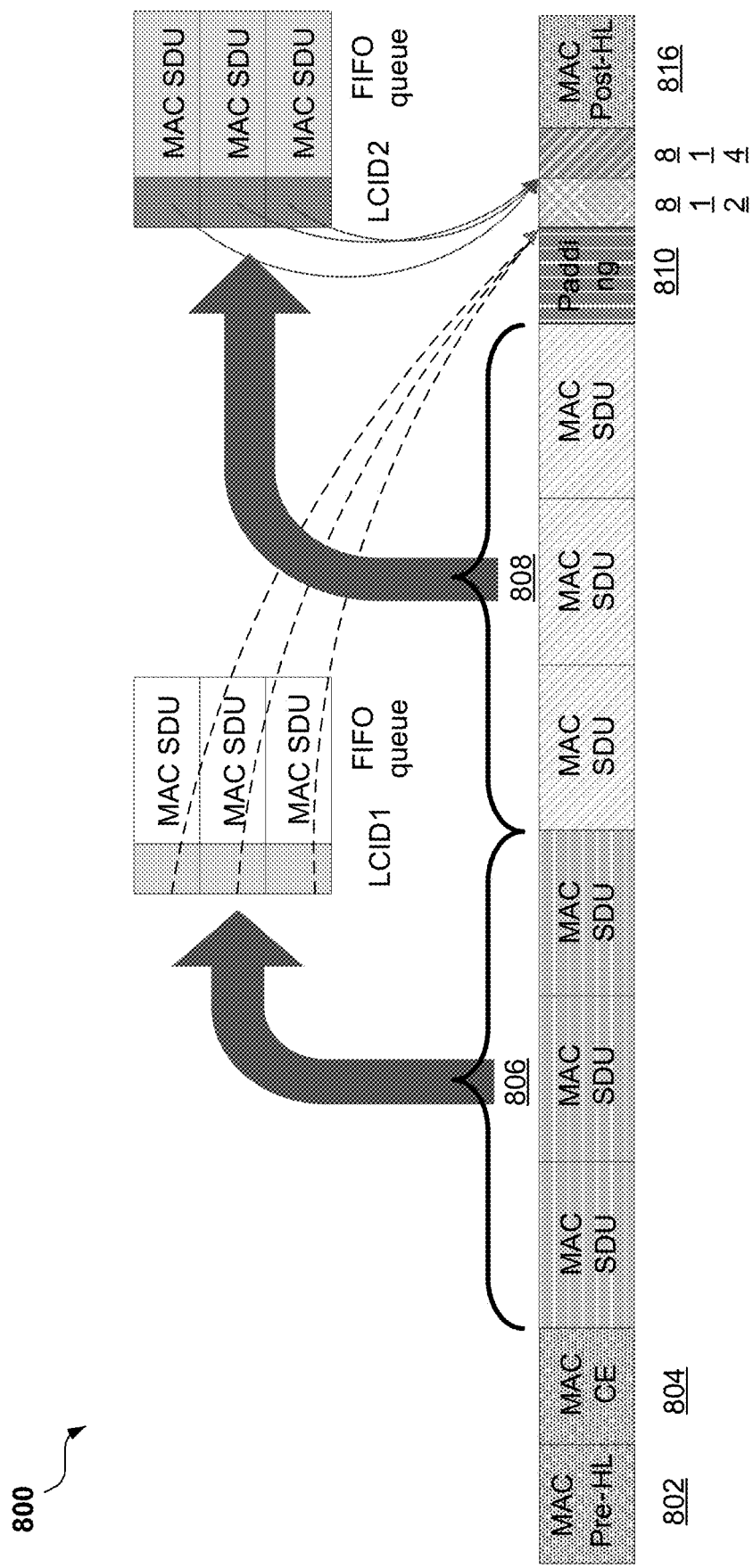
FIG. 8 is a block diagram of an example transport block according to one or more of the presently described aspects.

FIG. 8 is an example block diagram of a MAC PDU 800. In some aspects, the MAC PDU 800 may be the same as or similar to the MAC transport block 52. As shown, the various portions of the MAC PDU 800 are shown allocated, defined, scheduled, positioned, ordered, or etc., to the resources (e.g., symbols) of the MAC PDU 800 in order from beginning (e.g., a first symbol) to end (e.g., a last symbol) (i.e., left to right). For example, the MAC PDU 800 may include a MAC pre-subheader 802, MAC control elements 804, MAC SDUs 806 and 808, padding 810, a first LCID and/or length combination portion (e.g., which may correspond to or be included within a MAC SDU or a header of a MAC SDU), a second LCID and/or length combination portion (e.g., which may correspond to or be included within a MAC SDU or a header of a MAC SDU), and a MAC post-subheader 816. The pre-subheader 802 and the post-subheader 816 may be the same as or similar to pre-subheader 56 and post-subheader 60, respectively.

In some aspects, each of pre-subheader 802 and/or post-subheader 816 may be of fixed size and having a known structure. On the other hand, a size of the pre-subheader 802 may be at the beginning of the MAC PDU 800 (MAC pre-HL). In some aspects, the MAC post-subheader 816 may be a backward pointer to the start of the MAC header. Further, the padding 810 may be added between the last MAC SDU and the post-subheader 816.

Additionally, the MAC control elements 804 may be at the beginning of the MAC PDU 800. A local cyclic redundancy check (CRC) may be added at the beginning that allows the initial headers to be processed separately (e.g., a sub-physical layer channel, first resource block, or every resource block). Such portion of the header may form a partial MAC header, or a pre-subheader 802 for MAC. In some aspects, reception of the control elements 804 may be acknowledged by a receiver. For instance, the acknowledgment may be split into a control portion and data portion, with the control acknowledgment designed to be more reliable than the data acknowledgment.

CRC for the MAC header may include a CRC for the pre-subheader 802 and a CRC for the post-subheader 816. For example, a CRC may be included as part of or for the pre-subheader 802 or for a full header at the beginning. In some aspects, such CRC may be a CRC on or for only the pre-subheader 802, CRC on a first part of the MAC PDU 800 that covers at least the pre-subheader 802, and/or CRC per MAC subheader (e.g., MAC CE 804 subheader). Further, a CRC may be included as part of or for the post-subheader 816 or for a full header at the end. In some aspects, such CRC may be a CRC on or for only the post-subheader 816, CRC on a first part of the MAC PDU 800 that covers at least the post-subheader 816, and/or CRC per MAC subheader (e.g., MAC CE 804 subheader).

In some aspects, a receiver may acknowledge receipt of at least the MAC control elements 804 and/or the pre-subheader 802 and post-subheader 816. For example, the acknowledgment indication or message may be split or divided into a control and data portion. The control acknowledgment may be designed as more reliable than the data acknowledgement. The acknowledgment may be a physical layer (e.g., using two separate physical channels), and/or a MAC layer (e.g., using one physical channel carrying multiple bits). For example, the MAC layer may carry two bits including one for control and one for data. In some aspects, the MAC layer may carry N bits such that for N-1 each bit may be for each CRC and one bit for acknowledging the data. In some aspects, the MAC layer may carry tri-level information (e.g., Ack control, Ack control and data, Nack control and Data), where control data represents a MAC subheader covered by CRC, or control data represents a pre-subheader 802.

FIG. 9A illustrates an example of a TB 900 built by the UE 12, and more specifically, via MAC encoder/decoder manager component 40, in accordance with certain aspects. In some aspects, TB 900 may be the same as or similar to MAC transport block 52. As shown, the various portions of the TB 900 are shown allocated, defined, scheduled, positioned, ordered, or etc., to the resources (e.g., symbols) of the TB 900 in order from beginning (e.g., a first symbol) to end (e.g., a last symbol) (i.e., left to right). Though certain aspects with respect to the figures herein are described as allocating certain portions, elements, headers, data fields, data, etc. to one or more TBs. The portions, elements, headers, data fields, data, etc., may similarly be defined, scheduled, positioned, ordered, etc., as discussed to one or more TBs. In particular, the left most portion of the TB 900 may correspond to a first bit of the TB 900, and a right most portion of the TB 900 may correspond to a last bit of the TB 900.

In this example, the TB 900 begins with a MAC sub-header for the MAC CE (MAC subHDR CE), followed by the MAC sub-headers for the MAC SDUs (MAC subHDR SDU1 and MAC subHDR SDU2, in order). Following the MAC sub-headers in the TB 900 is the MAC CE, followed by the MAC SDUs (MAC SDU1 and MAC SDU2, in order). In particular, MAC SDU1 includes, in order, an RLC header (RLC HDR1), PDCP header (PDCP HDR1), and PDCP SDU (PDCP SDU1). Further, MAC SDU2 includes, in order, an RLC header (RLC HDR2), PDCP header (PDCP HDR2), and PDCP SDU (PDCP SDU2). Accordingly, in certain aspects, all the MAC sub-headers are allocated at the beginning of the TB 900, followed by the MAC CE and MAC SDUs. Such a TB 900 may be used for particular technologies, such as LTE.

FIG. 9B illustrates an example of a TB 940 built by the UE 12, and more specifically, via MAC encoder/decoder manager component 40, in accordance with certain aspects. In some aspects, TB 940 may be the same as or similar to MAC transport block 52. As shown, the various portions of the TB 940 are shown allocated to the resources (e.g., symbols) of the TB 940 in order from beginning (e.g., a first symbol) to end (e.g., a last symbol) (i.e., left to right). In particular, the left most portion of the TB 940 may correspond to a first bit of the TB 940, and a right most portion of the TB 940 may correspond to a last bit of the TB 940.

In this example, unlike TB 900, in TB 940 the MAC sub-headers are not allocated continuously at the beginning of the TB 940. Instead, each MAC sub-header is allocated adjacent to and at the beginning of the corresponding MAC SDU, and the MAC SDUs are allocated in order in the TB 940. As shown, the TB 940 begins with MAC subHDR SDU1 followed by MAC SDU1, and then MAC subHDR SDU2 followed by MAC SDU2.

As shown, the TB 940 does not include a MAC CE or corresponding MAC subHDR CE. Accordingly, certain aspects described herein provide techniques for allocating MAC CE and the corresponding MAC sub-header to a TB where MAC sub-headers are not allocated continuously at the beginning of the TB (e.g., TB 940).

In certain aspects, the MAC CE and corresponding sub-header may be allocated, defined, scheduled, positioned, ordered, or etc., at the beginning of the TB (e.g., occupying the first bit of the TB). In certain aspects, the MAC CE and corresponding sub-header may be allocated, defined, scheduled, positioned, ordered, or etc., at the end of the TB (e.g., occupying the last bit of the TB corresponding to non-padding bits (e.g., there may be additional padding bits after the MAC CE)).

FIG. 10A illustrates an example of a TB 1000A built by the UE 12, and more specifically, via MAC encoder/decoder manager component 40, in accordance with certain aspects. In some aspects, the TB 100A may be the same as or similar to MAC transport block 52. As shown, the TB 1000A is an example of a TB with the MAC subHDR CE and MAC CE at the beginning of the TB 1000A, followed by the fields in order as described with respect to the TB 940.

FIG. 10B illustrates an example of a TB 1000B built by the UE 12, and more specifically, via the MAC encoder/decoder manager component 40, in accordance with certain aspects. In some aspects, TB 1000B may be the same as or similar to MAC transport block 52. As shown, the TB 1000B is an example of a TB with the MAC subHDR CE and MAC CE at the end of the TB 1000B, following the fields in order as described with respect to TB 940.

In some aspects, including the MAC CE and corresponding sub-header at the beginning of the TB provides certain advantages. For example, including the MAC CE at the beginning of the TB means the network entity 14 and/or 20 receiving the TB can receive the MAC CE sooner and process the MAC CE sooner (e.g., assuming there is no cyclic redundancy check (CRC) associated with the TB).

In some aspects, including the MAC CE and corresponding sub-header at the end of the TB provides certain advantages. For example, some MAC CEs are generated by the UE 12 after the rest of the TB is built, such as because the information for the MAC CE is based on the data in the TB. Accordingly, by placing MAC CE at the end of the TB, portions of the TB can still be built and transmitted by the UE 12 to the network entity 14 and/or 20 prior to the MAC CE being generated and transmitted. Otherwise, if the MAC CE was at the beginning of the TB, the UE 120 could not begin transmitting the TB until after the MAC CE is generated, potentially increasing latency.

In some aspects, as discussed, different PDCP SDUs, and accordingly different MAC SDUs, may correspond to data from different logical channels. In particular, a single TB may include MAC SDUs corresponding to different logical channels. A receiver of a TB (e.g., BS 110), may be capable of processing the MAC SDUs of different logical channels in parallel. In particular, the MAC SDUs associated with a given logical channel may be in order, and need to be processed in order, but the MAC SDUs of different logical channels can be processed in parallel.

In some aspects, the design of the MAC TB 52, TB 900, TB 940, TB 1000A or TB 1000B may make parallel processing of MAC SDUs of different logical channel difficult. In particular, to determine where each of the MAC SDUs for each logical channel are in TB 900/940/1000A/1000B, the network entity 14 or 20 needs to process each MAC SDU in order as in the TB as there is no other information in the TB delineating where the MAC SDUs are positioned in the TB. Accordingly, parallel processing of the MAC SDUs from different logical channels is not achieved, as each MAC SDU is processed serially in order in the TB.

Accordingly, certain aspects herein provide an additional overall MAC header 62 (e.g., in addition to the MAC sub-headers described herein) in the TB that indicates the position and/or size of consecutive packets of each logical channel. For example, for each logical channel, the corresponding MAC SDUs may be positioned together consecutively. Further, the MAC SDUs of one logical channel may be positioned in the TB, followed by the MAC SDUs of another logical channel, and so on. The overall MAC header 62 may indicate, for each logical channel, the size of the MAC SDUs of the logical channel, or indicate the starting position of the MAC SDUs of the logical channel, or some other information that the network entity 14 or 20 can use to determine the delineation between MAC SDUs of different logical channels. Accordingly, the network entity 14 or 20 can utilize this information to parse the MAC SDUs into groups of consecutive MAC SDUs each associated with a different logical channel and process these groups in parallel. In some aspects, the overall MAC header 62 may be allocated, defined, scheduled, positioned, ordered, or etc. at the beginning of a TB (e.g., followed by the information of MAC TB 52, TB 900, TB 940, 1000A, 1000B, or etc.). In some aspects, the overall MAC header 62 may be allocated, defined, scheduled, positioned, ordered, or etc. at the end of a TB (e.g., following the information of MAC TB 52, TB 900, 940, 1000A, 1000B, or etc.).

In some aspects, the overall MAC header 62 may include information indicating to which logical channel each of the groups of MAC SDUs belong. In some such aspects, since the overall MAC header 62 may include such information, the overall MAC header 62 may not be included in the MAC sub-headers for each of the MAC SDUs.

FIG. 11 illustrates an example of a TB 1100 built by the UE 12, and more specifically via the MAC encoder/decoder manager component 40, in accordance with certain aspects. In some aspects, the TB 1100 may be the same as or similar to MAC TB 52. As shown, the TB 1100 may be an example of a TB including an overall MAC header 62, as described herein. As shown, the TB 1100 may include the fields of TB 1000B, followed by the overall MAC header.

In one example, the MAC SDU1 and MAC SDU2 belong to a first logical channel. Further, the MAC SDU3 and MAC SDU4 belong to a second logical channel. Additionally, the MAC SDU5 belongs to a third logical channel. In some aspects, the overall MAC header 52 may indicate a size of the MAC SDUs of each of the first, second, and third logical channels. For example, the overall MAC header may include a size of the combination of the MAC SDU1 and MAC SDU2 as the size corresponding to the first logical channel. Further, the overall MAC header 52 may include a size of the combination of the MAC SDU3 and MAC SDU4 as the size corresponding to the second logical channel. Additionally, the overall MAC header 52 may include a size of the MAC SDU5 as the size corresponding to the third logical channel. The network entity 14 or 20 may utilize this information to determine where MAC SDUs for each logical channel are positioned in TB 1100 and process the MAC SDUs for different logical channels in parallel.

Figure 12:
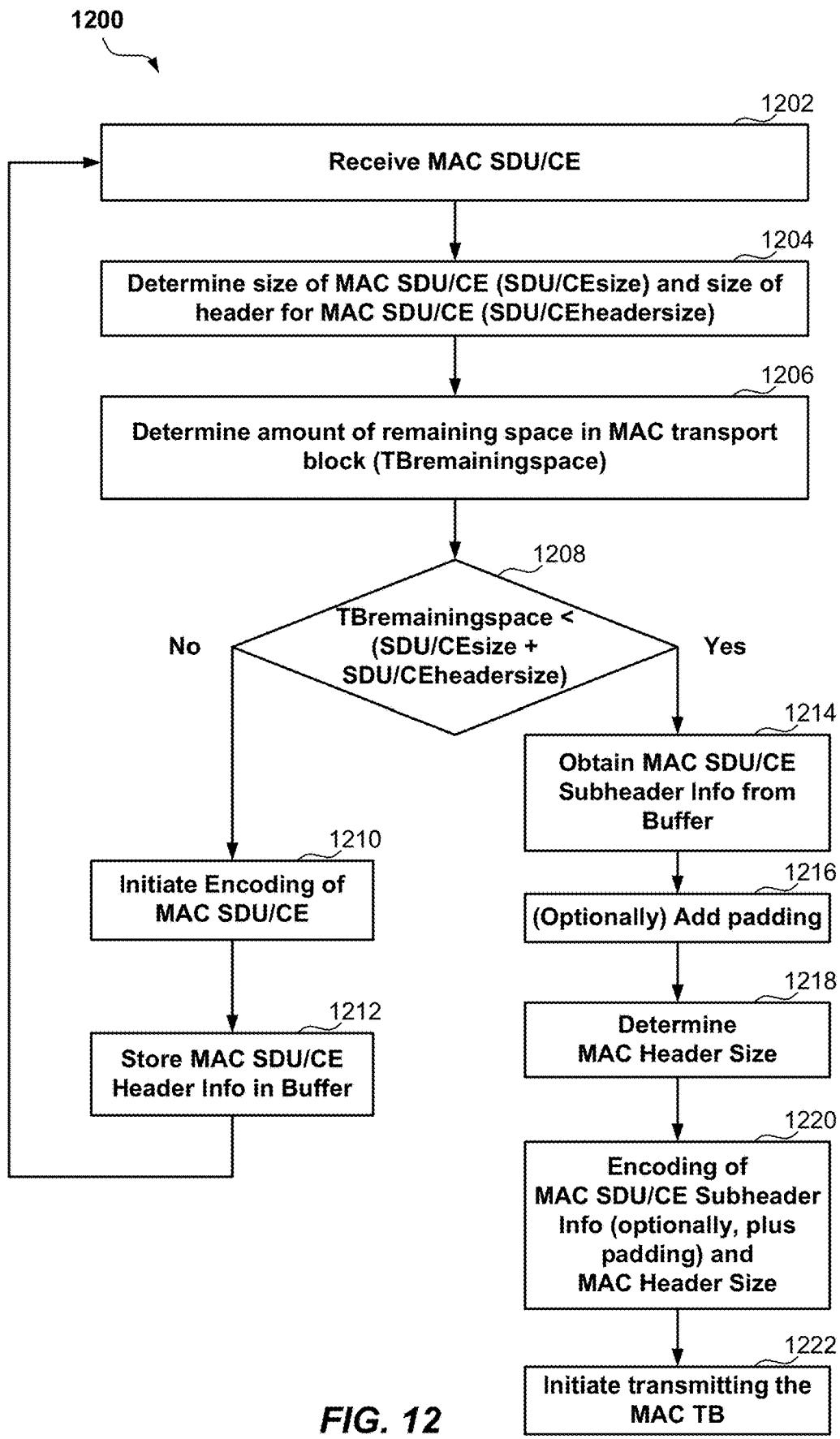
FIG. 12 is a flow chart of an example method of wireless communications including building, at a MAC layer, a MAC transport block (TB) having an enhanced MAC header format according to one or more of the presently described aspects.

Referring to FIG. 12, an example method 1200 of operating the MAC encoder/decoder manager component 40, and/or a UE 12 or network entity 14 or 20 executing MAC encoder/decoder manager component 40, include receiving a MAC SDU/CE at block 802. For example, in an aspect, MAC encoder/decoder manager 40 and/or one or more components of the UE 12 may obtain one or more MAC SDUs/CEs 22 from one or more logical channels of an RLC protocol layer, and/or from one or more transmit queues of one or more logical channels.

At block 1204, method 1200 includes determining a size the respective MAC SDU/CE 22 and the size of the corresponding MAC subheader information. For example, in an aspect, the MAC encoder/decoder manager 40 and/or one or more components of the UE 12 may determine the respective sizes as described herein.

At block 1206, method 1200 includes determining a remaining space in the MAC transport block. For example, in an aspect, the MAC encoder/decoder manager 40 and/or one or more components of the UE 12 may determine the remaining space as described herein.

At 1208, method 1200 includes determining whether the remaining space in the MAC transport block is less than the sum of the size the respective MAC SDU/CE 22 and the size of the corresponding MAC subheader information. For example, in an aspect, the MAC encoder/decoder manager 40 and/or one or more components of the UE 12 may determine whether or not sufficient space remains in the MAC transport block to continue processing the current MAC SDU/CE.

If the remaining space is not too small, e.g., if there is sufficient remaining space to accommodate processing the respective MAC SDU/CE, then method 1200 operates to continue to build the MAC transport block. At block 1210, method 1200 includes initiating encoding of the respective MAC SDU/CE. Additionally, at block 1212, method 1200 further includes storing the corresponding MAC subheader information in a buffer. After block 1212, method 1200 may return to block 1202 to evaluate whether a next MAC SDU/CE can be processed. For example, in an aspect, the MAC encoder/decoder manager 40 and/or one or more components of the UE 12 may perform the actions of blocks 1210 and 1212.

If the remaining space is too small, e.g., if there is not sufficient remaining space to accommodate processing the respective MAC SDU/CE, then method 1200 operates to prepare the MAC transport block for transmission. At block 1214, method 1200 includes obtaining the stored MAC SDU/CE subheader information from the buffer. At block 1216, optionally, method 1200 includes adding padding to the MAC transport block, and adding MAC subheader information for the padding to the obtained, stored MAC SDU/CE subheader information. Further, at block 1218, method 1200 includes determining a MAC header size for the stored MAC SDU/CE subheader information (and, optionally, the MAC subheader information for the padding). Additionally, at block 1220, method 1200 includes encoding of the MAC SDU/CE subheader information (and, optionally, padding) into the MAC transport block. Finally, at block 1222, method 1200 includes initiating transmission of the MAC transport block. For example, in an aspect, the MAC encoder/decoder manager 40 and/or one of its components may perform the actions of blocks 1214, 1216, 1218, 1220, and 1222.

It should be noted that method 800 may then be repeated for one or more subsequent MAC transport blocks, e.g., until all information from the logical channels of the RLC layer is transmitted.

In one particular use case, a method of wireless communications includes identifying, by a processor, pending information received on one or more logical channels at a MAC layer, where the pending information includes data information and/or control information to be included in a MAC transport block, determining, by the processor, a size requirement corresponding to an amount of space that will be taken up by the pending information and corresponding MAC subheader information in the transport block, determining, by the processor, a remaining space available in the transport block, when the remaining space in the transport block is greater than or equal to the size requirement: initiating encoding of the pending information into the transport block, and when the remaining space in the transport block is less than the size requirement: determining a MAC header size based at least in part on a size of stored subheader information corresponding to prior information already encoded into the MAC transport block, initiating encoding of at least the stored subheader information and a MAC header size indication representing the MAC header size into the MAC transport block such that the stored subheader information and the MAC header size indication are encoded subsequent to, and positioned within the MAC transport block subsequent to, at least the prior information; and initiating transmission of the MAC transport block.

Also, in an aspect, the method 1200 may further include encoding the pending information and/or the prior information to begin at a leading end of the MAC transport block; and encoding the MAC header size indication at a trailing end of the MAC transport block opposite the leading end.

Additionally, with regard to encoding the prior information and/or the pending information, the stored subheader information and/or pending header information corresponding to the pending information, and the MAC header size indication is based on reading the prior information and the pending information in only a single pass.

Further, in some aspects, the method may further include 1200 encoding subheader information corresponding to the prior information and/or the pending information in either a first format or a second format; wherein the first format relatively positions control information subheaders, then data information subheaders, and then a padding subheader, each in order beginning at a leading end of the transport block; and wherein the second format relatively positions the padding subheader, then the data information subheaders, and then the control information subheaders, each in reverse order beginning at the leading end of the transport block.

In some cases, when the remaining space in the transport block is greater than the size that the information will take up in the transport block, the method may further include storing subheader information corresponding to the information in a buffer In some cases, when the remaining space in the transport block is less than the size requirement, the determining of the MAC header size is further based on a size of any padding, and the initiating of the encoding further comprises initiating encoding of the padding such that the padding is encoded subsequent to, and positioned in the MAC transport block subsequent to, the prior information.

In an alternative aspect, such as in a device receiving the MAC transport block having the enhanced MAC header, a method of wireless communications includes receiving, by a processor, a media access control (MAC) transport block having at least a MAC header size indication positioned within the MAC transport block subsequent to control information and/or data information within the MAC transport block, wherein the MAC header size indication represents a MAC header size of MAC subheader information corresponding to the control information and/or data information; determining a location of the MAC subheader information within the MAC transport block relative to a position of the MAC header size indication based on the MAC header size indication; and decoding the MAC subheader information, the control information, and/or data information in response to locating the MAC subheader information.

Figure 13:
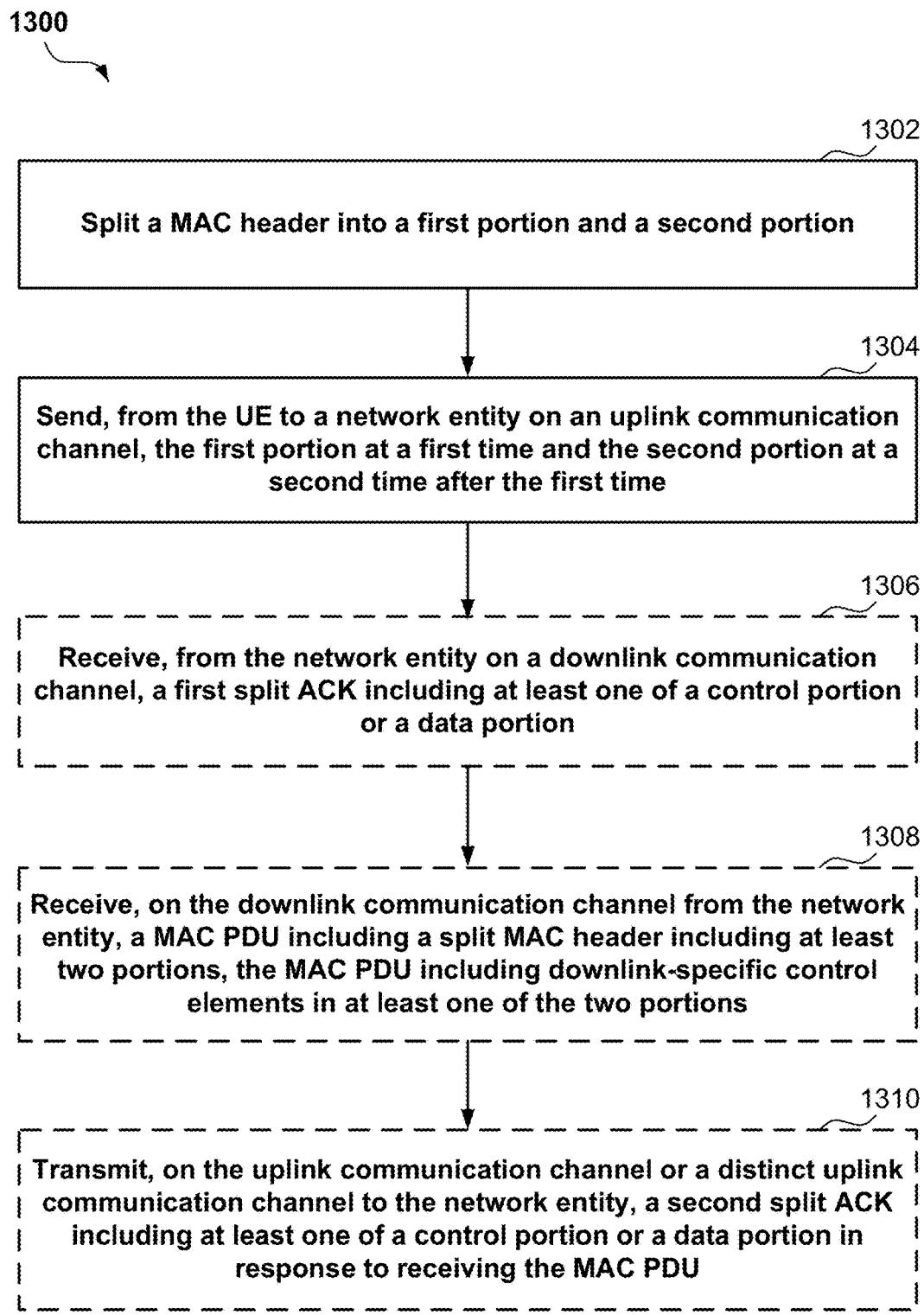
FIG. 13 is a flow chart of an example method of wireless communications at a user equipment (UE) including splitting and sending a MAC header according to one or more of the presently described aspects.

Referring to FIG. 13, an example method 1300 of operating MAC encoder/decoder manager component 40, and/or the UE 12 executing the MAC encoder/decoder manager 40, splitting a MAC header into a first portion and a second portion at block 1302. For example, in an aspect, the MAC encoder/decoder manager component 40 and/or one or more components of the UE 12 may split a MAC header 56 into a first portion (e.g., pre-subheader 58) and a second portion (e.g., post-subheader 60).

In some aspects, the first portion may include a pre-subheader 58 and the second portion includes a post-subheader 60. In some aspects, the pre-subheader 58 may be located at a beginning of a MAC PDU (e.g., MAC transport block 52). In some aspects, a size of the pre-subheader 58 may be at least one of a fixed size known to one or both of the UE 12 or the network entity 14 or 20, or a variable size indicated at the beginning of the MAC PDU (e.g., MAC transport block 52).

In some aspects, the MAC PDU (e.g., MAC transport block 52) may include a CRC according to at least one of on the pre-subheader 58, on the first portion of the MAC PDU (e.g., MAC transport block 52) covering at least the pre-subheader 58, or per MAC control element. In some aspects, the post-subheader 60 is located at an end of a MAC PDU (e.g., MAC transport block 52). In some aspects, the post-subheader 60 may include a header length corresponding to a backward pointer to a beginning of the MAC PDU (e.g., MAC transport block 52). In some aspects, the MAC PDU (e.g., MAC transport block 52) includes a CRC according to at least one of on the post-subheader 60, on the second portion of the MAC PDU (e.g., MAC transport block 52) covering at least the post-subheader 60, or per MAC control element.

At block 1304, method 1300 may send, from the UE to a network entity on an uplink communication channel, the first portion at a first time and the second portion at a second time after the first time. For example, in an aspect, the MAC encoder/decoder manager component 40 and/or one or more components of the UE 12 may send, from the UE 12 to a network entity 14 or 20 on an uplink communication channel, the first portion (e.g., pre-subheader 58) at a first time and the second portion (e.g., post-subheader 60) at a second time after the first time.

At block 1306, method 1300 may optionally receive, from the network entity on a downlink communication channel, a first split ACK including at least one of a control portion or a data portion. For example, in an aspect, the MAC encoder/decoder manager component 40 and/or one or more components of the UE 12 may receive, from the network entity 14 or 20 on a downlink communication channel, a first split ACK including at least one of a control portion or a data portion.

At block 1308, method 1300 may optionally receive, on the downlink communication channel from the network entity, a MAC PDU including a split MAC header including at least two portions, the MAC PDU including downlink-specific control elements in at least one of the two portions. For example, in an aspect, the MAC encoder/decoder manager component 40 and/or one or more components of the UE 12 may receive, on the downlink communication channel from the network entity 14 or 20, a MAC PDU (e.g., MAC transport block 52) including a split MAC header 56 including at least two portions (e.g., pre-subheader 58 and/or post-subheader 60), the MAC PDU including downlink-specific control elements in at least one of the two portions.

At block 1310, method 1300 may optionally transmit, on the uplink communication channel or a distinct uplink communication channel to the network entity, a second split ACK including at least one of a control portion or a data portion in response to receiving the MAC PDU. For example, in an aspect, the MAC encoder/decoder manager component 40 and/or one or more components of the UE 12 may transmit, on the uplink communication channel or a distinct uplink communication channel to the network entity, a second split ACK including at least one of a control portion or a data portion in response to receiving the MAC PDU (e.g., MAC transport block 52).

Figure 14:
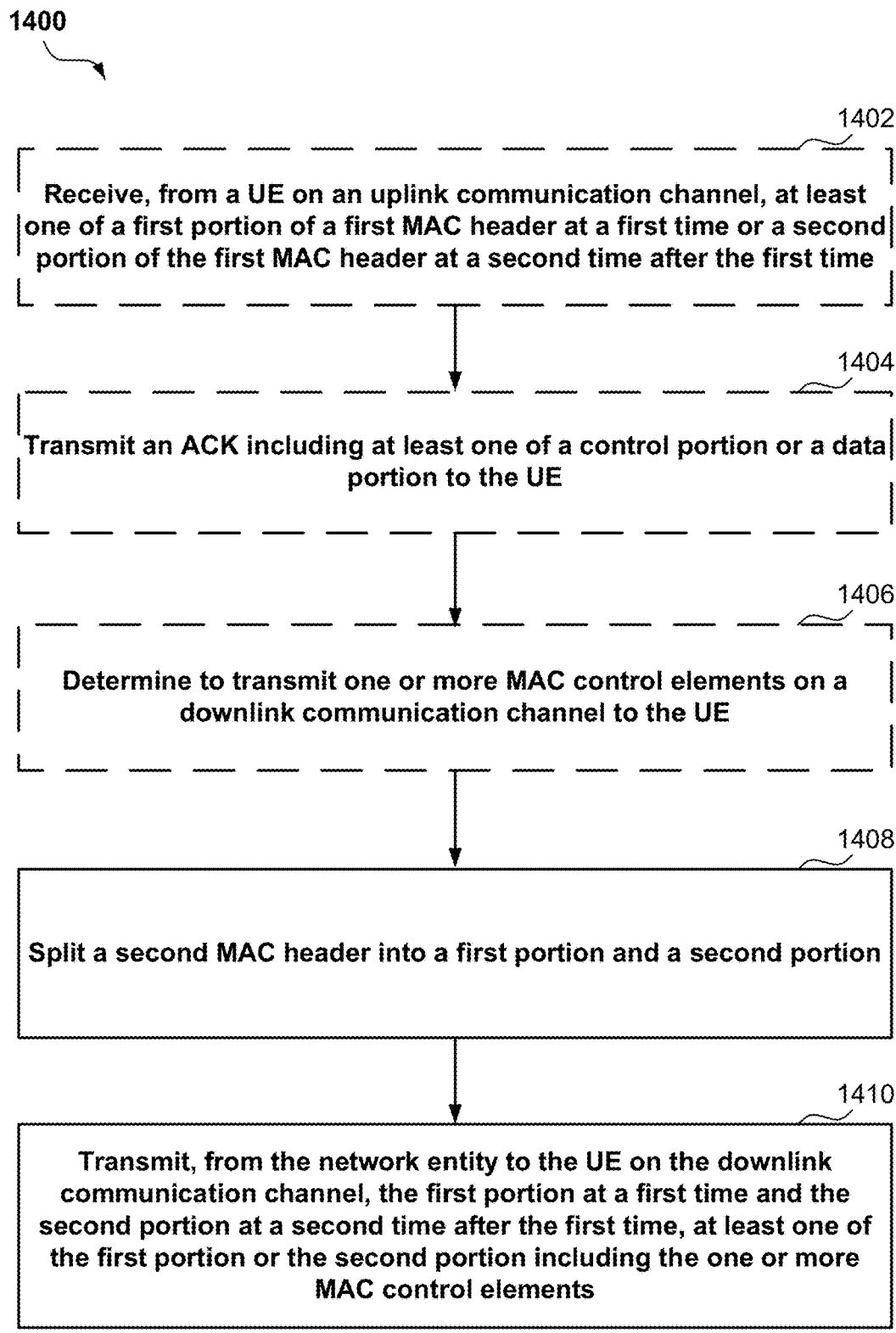
FIG. 14 is a flow chart of an example method of wireless communications at a network entity including splitting and sending a MAC header according to one or more of the presently described aspects.

Referring to FIG. 14, an example method 1400 of operating MAC encoder/decoder manager component 40, and/or the network entity 14 or 20 executing MAC encoder/decoder manager component 40, may optionally receive, from a UE on an uplink communication channel, at least one of a first portion of a first MAC header at a first time or a second portion of the first MAC header at a second time after the first time at block 1402. For example, in an aspect, the MAC encoder/decoder manager 40 and/or one or more components of the network entity 14 or 20 may receive, from a UE 12 on an uplink communication channel, at least one of a first portion (e.g., pre-subheader 58) of a first MAC header (e.g., MAC transport block 52) at a first time or a second portion (e.g., post-subheader 60) of the first MAC header (e.g., MAC transport block 52) at a second time after the first time.

At block 1404, method 1400 may optionally transmit an ACK including at least one of a control portion or a data portion to the UE. For example, in an aspect, the MAC encoder/decoder manager 40 and/or one or more components of the network entity 14 or 20 may transmit an ACK including at least one of a control portion or a data portion to the UE 12 in response to receiving at least one of a first portion (e.g., pre-subheader 58) of a first MAC header (e.g., MAC transport block 52) at a first time or a second portion (e.g., post-subheader 60) of the first MAC header (e.g., MAC transport block 52) at a second time after the first time.

At block 1406, method 1400 may optionally determine to transmit one or more MAC control elements on a downlink communication channel to the UE. For example, in an aspect, the MAC encoder/decoder manager 40 and/or one or more components of the network entity 14 or 20 may determine to transmit one or more MAC control elements on a downlink communication channel to the UE 12.

At block 1408, method 1400 may split a second MAC header into a first portion and a second portion. For example, in an aspect, the MAC encoder/decoder manager 40 and/or one or more components of the network entity 14 or 20 may split a second MAC header (e.g., MAC header similar to MAC transport block 52) into a first portion (e.g., pre-subheader 58) and a second portion (e.g., post-subheader 60).

At block 1410, method 1400 may transmit, from the network entity to the UE on the downlink communication channel, the first portion at a first time and the second portion at a second time after the first time, at least one of the first portion or the second portion including the one or more MAC control elements. For example, in an aspect, the MAC encoder/decoder manager 40 and/or one or more components of the network entity 14 or 20 may transmit, from the network entity 14 or 20 to the UE 12 on the downlink communication channel, the first portion (e.g., pre-subheader 58) at a first time and the second portion (e.g., post-subheader 60) at a second time after the first time, at least one of the first portion (e.g., pre-subheader 58) or the second portion (e.g., post-subheader 60) including the one or more MAC control elements.

Figure 15:
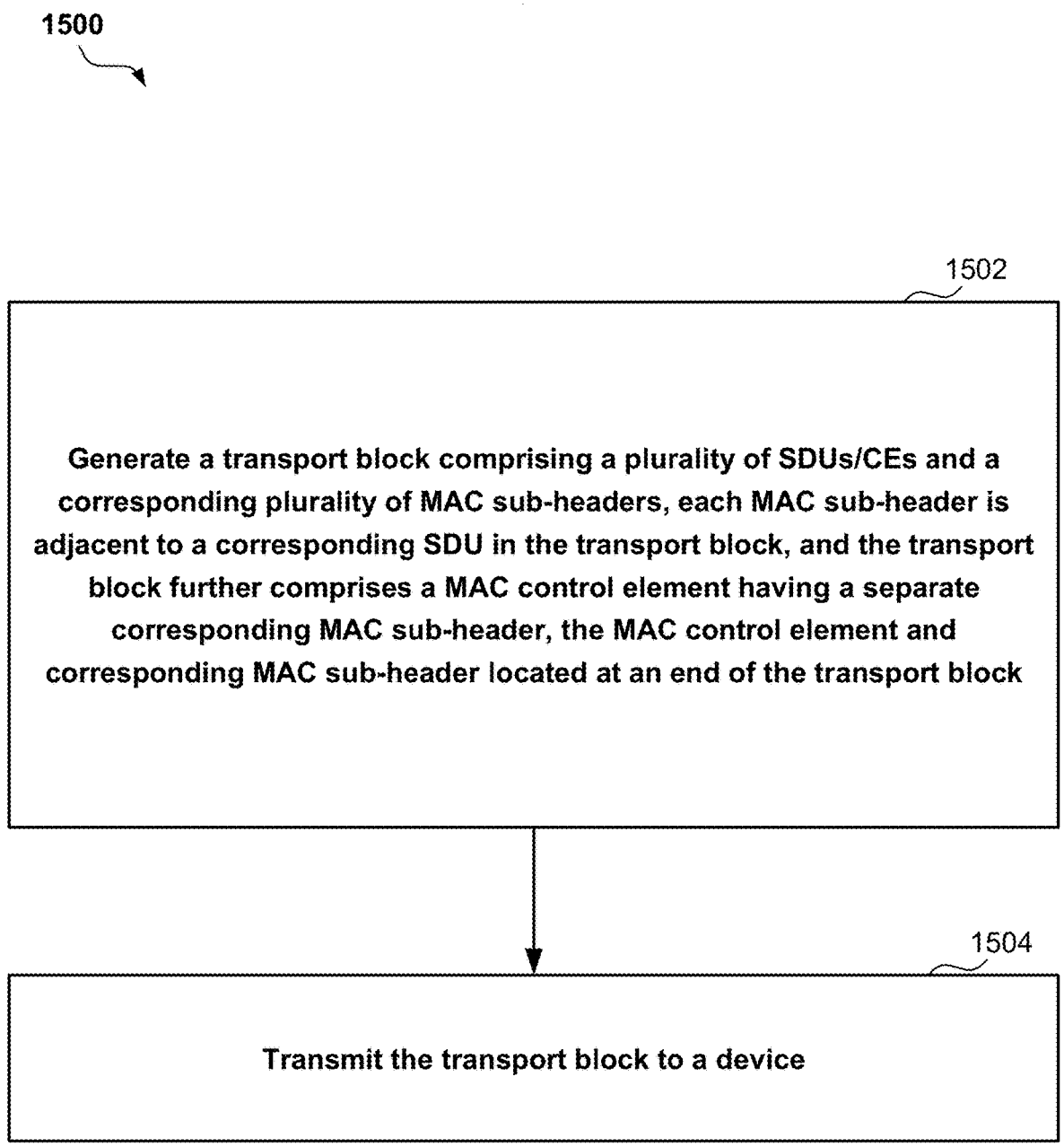
FIG. 15 is a flow chart of a first example method of wireless communications including generating and transmitting transport blocks according to one or more of the presently described aspects.

Referring to FIG. 15, an example method 1500 of operating MAC encoder/decoder manager component 40, and/or the UE 12 executing MAC encoder/decoder manager component 40, may generate a transport block comprising a plurality of SDUs and a corresponding plurality of media access control sub-headers, each media access control sub-header is adjacent to a corresponding service data unit in the transport block, and the transport block further comprises a MAC control element having a separate corresponding media access control sub-header, the MAC control element and corresponding media access control sub-header located at an end of the transport block at block 1502. For example, in an aspect, the MAC encoder/decoder manager 40 and/or one or more components of UE 12 may generate a transport block (e.g., MAC transport block 52) comprising a plurality of SDUs/CEs 22 and a corresponding plurality of MAC sub-headers, each MAC sub-header is adjacent to a corresponding SDU in the transport block (e.g., MAC transport block 52), and the transport block (e.g., MAC transport block 52) further comprises a MAC control element having a separate corresponding MAC sub-header, the MAC control element and corresponding MAC sub-header located at an end of the transport block (e.g., MAC transport block 52). At block 1504, method 1500 may transmit the transport block to a device. For example, in an aspect, the MAC encoder/decoder manager 40 and/or one of its components may transmit the transport block (e.g., MAC transport block 52) to a device (e.g., network entity 14 or 20).

In some aspects, each SDU may include a MAC SDU. In some aspects, each SDU may include an RLC header, a PDCP header, and/or a PDCP SDU. In some aspects, a beginning of the transport block may include a first bit of the transport block. In some aspects, the end of the transport block may include a last bit corresponding to data of the transport block. In some aspects, at least one of the plurality of MAC sub-headers may be separated from another of the plurality of MAC sub-headers by an SDU.

Figure 16:
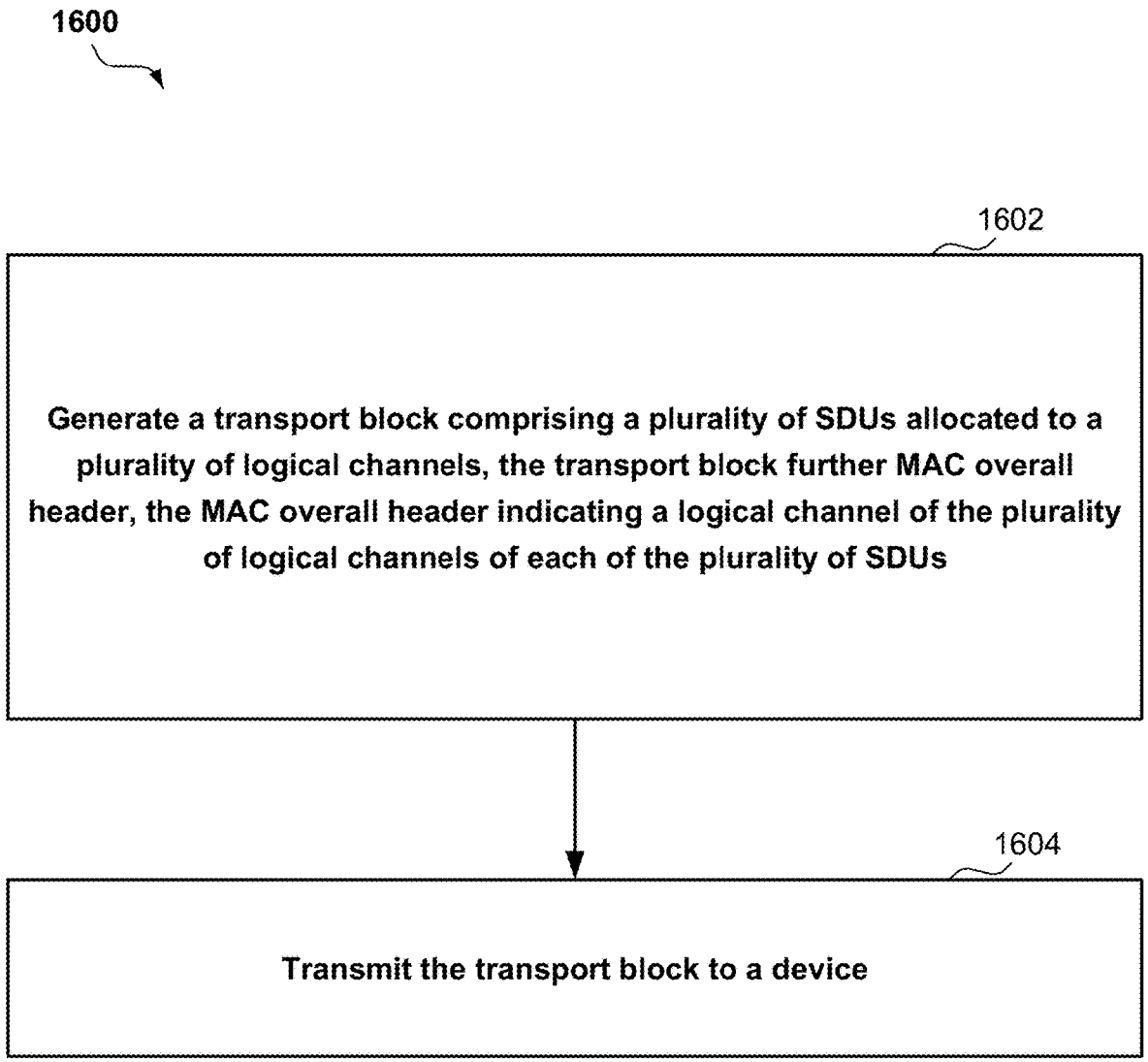
FIG. 16 is a flow chart of a second example method of wireless communications including generating and transmitting transport blocks according to one or more of the presently described aspects.

Referring to FIG. 16, an example method 1500 of operating MAC encoder/decoder manager component 40, and/or the UE 12 executing MAC encoder/decoder manager component 40, may generate a transport block comprising a plurality of SDUs allocated to a plurality of logical channels, the transport block further MAC overall header, the MAC overall header indicating a logical channel of the plurality of logical channels of each of the plurality of service data units at block 1602. For example, in an aspect, the MAC encoder/decoder manager 40 and/or one or more components of UE 12 may generate a transport block (e.g., MAC transport block 52) comprising a plurality of SDUs allocated to a plurality of logical channels, the transport block further MAC overall header 62, the MAC overall header 51 indicating a logical channel of the plurality of logical channels of each of the plurality of SDUs at block 1602. At block 1604, method 1600 may transmit the transport block to a device. For example, in an aspect, the MAC encoder/decoder manager 40 and/or one or more components of the UE 12 may transmit the transport block to a device (e.g., network entity 14 or 20).

In some aspects, the MAC overall header 62 may indicate at least one of a total size or position of consecutive SDUs for each of the plurality of logical channels. In some aspects, each SDU comprises a MAC SDU. In some aspects, each SDU may include an RLC header, a PDCP header, and/or a PDCP SDU. In some aspects, the MAC overall header 62 may be at the end of the transport block. In some aspects, the end of the transport block may include a last bit corresponding to data of the transport block. In some aspects, the MAC overall header 62 may be at the beginning of the transport block. In some aspects, the beginning of the transport block may include a first bit of the transport block. In some aspects, the transport block may include a plurality of MAC sub-headers corresponding to the plurality of SDUs. In some aspects, at least one of the plurality of MAC sub-headers may be separated from another of the plurality of MAC sub-headers by a SDU.

In another alternative implementation, an apparatus for wireless communications may include a transceiver; a memory configured to store instructions; and one or more processors communicatively coupled with the transceiver and the memory, wherein the one or more processors are configured to execute the instructions to perform the operations described herein, for example, with regard to the methods 1200, 1300, 1400, 1500, and/or 1600.

In a further alternative implementation, an apparatus for wireless communications may include one or more means for performing the operations described herein. Additionally, another implementation includes a computer-readable medium that includes code executable by one or more processors to perform the operations described herein, for example, with regard to the methods 1200, 1300, 1400, 1500, and/or 1600.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of telecommunication systems have been presented with reference to various apparatus and methods. These apparatus and methods have been described in the this detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Several aspects of a telecommunications system have been presented with reference to an LTE/LTE-A or a 5G communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications, comprising:
   generating a transport block comprising a plurality of service data units allocated to a plurality of logical channels, wherein the transport block further comprises:
   a plurality of media access control sub-headers associated with each of the plurality of service data units; and a single media access control overall header, the single media access control overall header indicating an association of distinct service data unit groups of the plurality of service data units to distinct logical channels of the plurality of logical channels to facilitate processing of the distinct service data unit groups in parallel, the single media access control overall header further indicating at least a starting position of the service data units for each distinct logical channel of the plurality of logical channels, and the single media access control overall header is distinct from the plurality of media access control sub-headers for each the plurality of service data units; and transmitting the transport block to a device.

2. The method of claim 1, wherein the single media access control overall header further indicates a position of consecutive service data units for each of the plurality of logical channels.

3. The method of claim 1, wherein each service data unit comprises a media access control service data unit.

4. The method of claim 3, wherein each service data unit further comprises a radio link control header, a packet data convergence protocol header, and a packet data convergence protocol service data unit.

5. The method of claim 1, wherein the single media access control overall header is at an end of the transport block.

6. The method of claim 5, wherein the end of the transport block comprises a last bit corresponding to data of the transport block.

7. The method of claim 1, wherein the single media access control overall header is at a beginning of the transport block.

8. The method of claim 7, wherein the beginning of the transport block comprises a first bit of the transport block.

9. The method of claim 1, wherein at least one of the plurality of media access control sub-headers is separated from another of the plurality of media access control sub-headers by a service data unit.

10. The method of claim 1, wherein the single media access control overall header further indicates a size of each distinct service data unit group associated with a distinct logical channel of the plurality of logical channels.

11. An apparatus for wireless communication, comprising:
    a transceiver;
    a memory configured to store instructions; and
    at least one processor communicatively coupled with the transceiver and the memory, wherein the at least one processor is configured to:
        generate a transport block comprising a plurality of service data units allocated to a plurality of logical channels, wherein the transport block further comprises:
            a plurality of media access control sub-headers associated with each of the plurality of service data units; and
            a single media access control overall header, the single media access control overall header indicating an association of distinct service data unit groups of the plurality of service data units to distinct logical channels of the plurality of logical channels to facilitate processing of the distinct service data unit groups in parallel, the single media access control overall header further indicating at least a starting position of the service data units for each distinct logical channel of the plurality of logical channels, and the single media access control overall header is distinct from the plurality of media access control sub-headers for each the plurality of service data units; and
        transmit the transport block to a device.

12. The apparatus of claim 11, wherein the media single access control overall header further indicates a position of consecutive service data units for each of the plurality of logical channels.

13. The apparatus of claim 11, wherein each service data unit comprises a media access control service data unit.

14. The apparatus of claim 11, wherein each service data unit further comprises a radio link control header, a packet data convergence protocol header, and a packet data convergence protocol service data unit.

15. The apparatus of claim 11, wherein the single media access control overall header is at an end of the transport block.

16. The apparatus of claim 15, wherein the end of the transport block comprises a last bit corresponding to data of the transport block.

17. The apparatus of claim 11, wherein the single media access control overall header is at a beginning of the transport block.

18. The apparatus of claim 17, wherein the beginning of the transport block comprises a first bit of the transport block.

19. The apparatus of claim 11, wherein at least one of the plurality of media access control sub-headers is separated from another of the plurality of media access control sub-headers by a service data unit.

20. An apparatus for wireless communications, comprising:
    means for generating a transport block comprising a plurality of service data units allocated to a plurality of logical channels, wherein the transport block further comprises:
        a plurality of media access control sub-headers associated with each of the plurality of service data units; and
        a single media access control overall header, the single media access control overall header indicating an association of distinct service data unit groups of the plurality of service data units to distinct logical channels of the plurality of logical channels to facilitate processing of the distinct service data unit groups in parallel, the single media access control overall header further indicating at least a starting position of the service data units for each distinct logical channel of the plurality of logical channels, and the single media access control overall header is distinct from the plurality of media access control sub-headers for each the plurality of service data units; and
    means for transmitting the transport block to a device.

21. The apparatus of claim 20, wherein the single media access control overall header is at an end of the transport block.

22. The apparatus of claim 21, wherein the end of the transport block comprises a last bit corresponding to data of the transport block.

23. The apparatus of claim 20, wherein the single media access control overall header is at an beginning of the transport block.

24. The apparatus of claim 23, wherein the beginning of the transport block comprises a first bit of the transport block.

25. A computer-readable medium storing computer executable code for wireless communication, comprising code for:
- generating a transport block comprising a plurality of service data units allocated to a plurality of logical channels, wherein the transport block further comprises:
  - a plurality of media access control sub-headers associated with each of the plurality of service data units; and
  - a single media access control overall header, the single media access control overall header indicating an association of distinct service data unit groups of the plurality of service data units to distinct logical channels of the plurality of logical channels to facilitate processing of the distinct service data unit groups in parallel, the single media access control overall header further indicating at least a starting position of the service data units for each distinct logical channel of the plurality of logical channels, and the single media access control overall header is distinct from the plurality of media access control sub-headers for each the plurality of service data units; and
- transmitting the transport block to a device.

26. The computer-readable medium of claim 25, wherein the single media access control overall header is at an end of the transport block.

27. The computer-readable medium of claim 26, wherein the end of the transport block comprises a last bit corresponding to data of the transport block.

28. The computer-readable medium of claim 25, wherein the single media access control overall header is at an beginning of the transport block.

29. The computer-readable medium of claim 28, wherein the beginning of the transport block comprises a first bit of the transport block.

* * * * *